US009012110B2

(12) United States Patent
Lowe et al.

(10) Patent No.: US 9,012,110 B2
(45) Date of Patent: Apr. 21, 2015

(54) METHOD OF PRODUCTION OF A HOLOGRAPHIC SENSOR

(71) Applicant: Cambridge Enterprise Limited, Cambridge (GB)

(72) Inventors: Christopher Robin Lowe, Cambridge (GB); Colin Alexander Bennett Davidson, Cambridge (GB); Jeffrey Blyth, Cambridge (GB)

(73) Assignee: Cambridge Enterprise Limited, Cambridge (GB)

(*) Notice: Subject to any disclaimer, the term of this patent is extended or adjusted under 35 U.S.C. 154(b) by 0 days.

(21) Appl. No.: 14/143,921

(22) Filed: Dec. 30, 2013

(65) Prior Publication Data

US 2014/0110886 A1 Apr. 24, 2014

Related U.S. Application Data

(63) Continuation of application No. 13/122,086, filed as application No. PCT/GB2009/051346 on Oct. 8, 2009, now abandoned.

(30) Foreign Application Priority Data

Oct. 9, 2008 (GB) .................................. 0818556.3

(51) Int. Cl.
*G03H 1/02* (2006.01)
*G03H 1/04* (2006.01)
(Continued)

(52) U.S. Cl.
CPC ......... *G03H 1/0465* (2013.01); *G03H 2260/16* (2013.01); *G03H 2260/62* (2013.01);
(Continued)

(58) Field of Classification Search
CPC ............ G03H 1/0465; G03H 2222/33; G03H 2222/36; G03H 2260/16; G03H 2260/62; G03H 2240/20; G03H 2001/0044; G03H 2001/026; G03H 2001/0268; G03H 2001/0415
See application file for complete search history.

(56) References Cited

U.S. PATENT DOCUMENTS 4,314,260 A * 2/1982 Drexler ..................... 346/135.1
4,451,114 A 5/1984 Nicholson et al.
(Continued)

FOREIGN PATENT DOCUMENTS

EP 0819782 1/1998
EP 1 475 678 A1 10/2004
(Continued)

OTHER PUBLICATIONS

Tarasenko et al., "Laser induced modification of metal nanoparticles formed by laser ablation technique in liquids", Appl. Surf. Sci. vol. 247 pp. 418-422 (2005).*

(Continued)

*Primary Examiner* — Martin Angebranndt
(74) *Attorney, Agent, or Firm* — Saliwanchik, Lloyd & Eisenschenk

(57) ABSTRACT

A method for the production of a holographic sensor which comprises a support medium supporting a reflection hologram wherein the support medium interacts with its physical or chemical environment to create an optical response which is a change in one or more optical properties of the hologram, the method comprising the steps of: a) introducing a colloidal dispersion of a recording material into the support medium; and b) ablating the colloidal particles of the recording material using a pulsed laser to form the holographic element in the support medium. The method of production can be used to introduce a reflection holographic grating into a hydrophobic support medium, in particular, polydimethylsiloxane (PDMS), which possesses an extraordinary ability to swell in the presence of both liquid and/or gaseous low molecular weight hydrocarbons and organic solvents and thus has many applications as a holographic sensor.

16 Claims, 19 Drawing Sheets

(51) Int. Cl.
*G03H 1/00* (2006.01)
*G03H 1/18* (2006.01)
*G03H 1/22* (2006.01)

(52) U.S. Cl.
CPC .... *G03H2240/20* (2013.01); *G03H 2001/0415* (2013.01); *G03H 1/00* (2013.01); *G03H 1/0244* (2013.01); *G03H 2001/0044* (2013.01); *G03H 2001/186* (2013.01); *G03H 2001/2231* (2013.01); *G03H 2222/33* (2013.01); *G03H 2270/52* (2013.01); *G03H 1/0486* (2013.01)

(56) References Cited

U.S. PATENT DOCUMENTS

| | | | | |
|---|---|---|---|---|
| 4,604,303 | A | * | 8/1986 | Takakura et al. ............. 427/229 |
| 4,794,087 | A | * | 12/1988 | Despax et al. ................. 430/41 |
| 4,999,278 | A | * | 3/1991 | Bouldin .................. 430/270.11 |
| 5,080,947 | A | * | 1/1992 | Yamada et al. ............. 428/64.4 |
| 5,135,780 | A | * | 8/1992 | Kissel ........................ 427/404 |
| 5,188,923 | A | * | 2/1993 | Ahn et al. ................ 430/270.12 |
| 5,989,923 | A | | 11/1999 | Lowe et al. |
| 6,689,316 | B1 | | 2/2004 | Blyth et al. |
| 6,712,997 | B2 | * | 3/2004 | Won et al. ..................... 252/503 |
| 2002/0054403 | A1 | | 5/2002 | Monaghan et al. |
| 2004/0079195 | A1 | * | 4/2004 | Perry et al. ..................... 75/345 |
| 2005/0036179 | A1 | * | 2/2005 | Chisholm et al. ................. 359/3 |
| 2005/0068594 | A1 | * | 3/2005 | Tomita et al. .................... 359/3 |
| 2005/0232532 | A1 | | 10/2005 | Wang et al. |
| 2009/0092746 | A1 | * | 4/2009 | Gu et al. ......................... 427/74 |
| 2009/0325079 | A1 | * | 12/2009 | Cetin et al. ...................... 430/2 |
| 2010/0132507 | A1 | * | 6/2010 | Perry et al. ..................... 75/345 |
| 2012/0276343 | A1 | * | 11/2012 | Huo et al. ..................... 428/188 |

FOREIGN PATENT DOCUMENTS

| | | |
|---|---|---|
| JP | 59-033191 | * 2/1984 |
| JP | 2001-216680 | * 8/2001 |
| JP | 2003-241626 | 8/2003 |
| JP | 2004-219435 | 8/2004 |
| JP | 2005-099612 | 4/2005 |
| JP | 2005-522703 | 7/2005 |
| JP | 2007-156452 | 6/2007 |
| WO | WO 95/26499 | 10/1995 |
| WO | WO 99/63408 | 12/1999 |
| WO | WO 03/087899 A1 | 10/2003 |
| WO | WO 2006/040772 A1 | 4/2006 |

OTHER PUBLICATIONS

Bell et al. "Preparation and characterization of nanoscale silver colloids by two Novel synthetic routes", J. Coll. Sci., vol. 242 pp. 300-305 (2001).*
Na et al., "Efficient formation of surface relief grating on azopolymer films by gold nanoparticles", J. Appl. Phys., vol. 104 pp. 103117-1 to 103117-5 (2008).*
Won et al., "Metallic nanocluster gratings generated by near-field coupling of localized surface plasmons", Opt. Expr., vol. 14(24) pp. 11814-11822 (Oct. 2006).*
Kiesow et al., "Generation of wavelength-dependent, periodic line pattern in metal nanoparticles containing polymers films by femtosecond laser irradiation", Appl. Phys. Lett., vol. 86 pp. 153111-1 to 153111-3 (2005).*
Seifert et al., "Production of 'dichrotic' diffraction gratings in glasses containing silver nanoparticles via particle deformation with ultrashort laser pulses", Appl. Phys. B., vol. 73 pp. 355-359 (2001).*
Podlipensky et al. "Femtosecond laser assisted production of dichromic 3D structures in composite glass containing Ag nanoparticles", Appl. Phys. A vol. 80 pp. 1647-1652 (2005).*
Zhang et al. "In situ synthesis of poly(dimethylsiloxane)-gold nanoparticles composite films and its application in microfluidic systems", Lab chip, vol. 8 pp. 352-357 (Nov. 2007).*
Li, Yan et al., "Single femtosecond pulse holography using polymethyl methacrylate," *Optics Express*, Oct. 21, 2002, vol. 10, No. 21, p. 1173-1178.

* cited by examiner

METHOD OF PRODUCTION OF A HOLOGRAPHIC SENSOR

CROSS REFERENCE TO A RELATED APPLICATION

This application is a continuation of co-pending application Ser. No. 13/122,086, filed Mar. 31, 2011, now abandoned; which is a National Stage Application of International Application Number PCT/GB2009/051346, filed Oct. 8, 2009; which claims priority to Great Britain Application No. 0818556.3, filed Oct. 9, 2008; all of which are incorporated herein by reference in their entirety.

FIELD OF THE INVENTION

This invention relates to a method of production of a holographic sensor and uses of the sensor produced according to the method.

BACKGROUND OF THE INVENTION

A hologram is a recording of an optical interference pattern between light waves. To generate a hologram, two coherent light beams from the one light source—called the object and reference beams—are made to overlap in a photosensitive material such as a photopolymer or silver-halide emulsion. The object beam propagates from the object and thus carries information about it, while the reference beam is used to both record and read-out the hologram. The optical interference pattern is physically stored as a change in absorption, refractive index or thickness of the recording material—turning it into a series of interference fringes (i.e. a diffraction grating) that contains information about the amplitude and phase of the two original light beams. By illuminating the grating with a reference beam to imitate the original reference beam, a copy of the original object can be reconstructed.

Holograms are widely used in many commercial applications including display holography, security, advertising and holographic optical elements and gratings.

The two most commercially important types of holograms are transmission holograms and reflection holograms.

A transmission hologram is one where the emergent rays leave the holographic support medium via the surface opposite that by which incident rays enter. The fringes of a transmission hologram are usually inclined to the surface at a considerable angle, for example, typically around 90°. The fringes of a transmission hologram run perpendicularly to the plane of the support medium and the spacing between fringes will remain virtually unchanged as the support medium swells or contracts. These holograms, which usually consist of a pattern on the surface of a plastic film coated on a reflective aluminium foil, are those used as security features on credit cards and other products—the foil allows the light to come from behind the hologram to reconstruct the image.

A reflection or Denisyuk hologram is a hologram where the interference pattern or grating is constructed by the reference and object beams entering the recording material from opposite sides. The holographic image can then be replayed by a point source of white light to imitate the original reference beam, thereby illuminating the hologram from the same side as the viewer. The fringes of a Denisyuk hologram are inside of and run substantially parallel to the surface of the holographic support medium. A Denisyuk hologram can reproduce a range of colours using white-light illumination on the same side of the hologram as the viewer.

Denisyuk or reflection holograms have traditionally been referred to as "volume gratings" as the fringe pattern is all located inside of the recording material. However, the term "volume gratings" is now also used to describe transmission hologram gratings where the interference pattern of fringes is recorded inside of the material, as well as on the surface of the material, as the two interfering beams overlap on the recording material from the same side. Usually only the surface patterns of transmission gratings are of interest commercially whereas with true reflection or Denisyuk holograms there is no surface grating.

As a Denisyuk hologram is produced by two beams hitting the support medium from opposite sides producing fringes that run substantially parallel to the plane of the support medium, like the pages in a closed book, the fringe spacing in a Denisyuk hologram will increase or decrease as the support medium swells or contracts. A change in fringe spacing means that when a replay of a hologram is made under a white light source then the reflection or Denisyuk-type hologram has the ability to vary its selection of wavelengths from the white light source thus giving a quasi-monochromatic replay colour to the image depending on the degree of swelling or contraction of the support medium. Reflection or Denisyuk-type holograms have found utility as sensors on the basis that interaction of an analyte or species to be detected with the support medium may cause a detectable change in the fringe spacing of the hologram.

In contrast, and as touched upon above, as the fringes of a transmission hologram run perpendicularly to the plane of the material, the spacing between fringes will remain virtually unchanged as the support medium swells or contracts. Accordingly, a transmission hologram will usually replay a rainbow of colours from a white light source regardless of the state of swelling of the support medium. For such reasons, transmission holograms have not found utility as sensors, rather they have found greater utility in data storage and security applications.

Typically, reflection or Denisyuk-type holograms use photographic emulsions made up of a polymer, a recording material such as a light-sensitive silver salt (silver bromide) and a photosensitizing dye coated onto glass or plastic substrates (holographic recording plate), and are constructed by passing a laser through the emulsion and returning it via reflection off a planar mirror that serves as the object. The standing-wave pattern created when the incident and reflected beams meet is preserved in 3-D via layers of ultra-fine grains of metallic silver, which means the hologram relies on diffractive reflection from the silver grains. To ensure that reflections from different locations interfere constructively with one other, the silver fringes must be spaced periodically.

Following exposure of the holographic recording plate, the plate must be developed, typically in a darkroom, in order to view the hologram. The developing process is long and tedious and typically involves the following steps:

a) Preparation of the developer and bleach solutions and, optionally, a wetting solution, and setting up appropriate apparatus' for use in the developing process;
b) Submersion of the holographic recording plate in the developer solution until the holographic recording plate has turned almost black;
c) Rinsing the developer solution from the holographic recording plate, typically using de-ionised water;
d) Submersion of the holographic recording plate in the bleach solution until the holographic recording plate is completely clear;
e) Rinsing the bleach solution from the holographic recording plate, typically using de-ionized water;

f) Optionally, placing the finished hologram in a wetting solution, which helps holograms to turn out much cleaner by reducing streaks and reducing drying time;

g) Drying the holographic recording plate.

Up until approximately ten years ago, relatively few suitable holographic film materials existed, the most common type of holographic film being a silver halide-containing gelatin film made by a liquid phase colloid formation technique, followed by coating onto a suitable support layer.

WO-A-9526499 discloses a holographic sensor, based on a volume hologram. This sensor comprises an analyte-sensitive matrix having an optical transducing structure disposed throughout its volume. Because of this physical arrangement of the transducer, the optical signal generated by the sensor is very sensitive to volume changes or structural rearrangements taking place in the analyte-sensitive matrix as a result of interaction or reaction with the analyte.

WO-A-99/63408 discloses a method of production of a holographic sensor which utilises a sequential treatment technique wherein the polymer film is made first and sensitive halide particles are added subsequently. The particles were introduced by diffusing soluble salts into the polymer matrix where they react to form an insoluble light-sensitive precipitate and, thereafter, the holographic image is recorded. This method of production allowed holograms to be recorded in a much wider range of polymer matrices, for example, polyvinyl alcohol, polyacrylamides, polymethacrylamides, polyhdroxyethyl methacrylate etc., which had previously been considered to be unsuitable for use in holography.

Thereafter, it has been discovered that a wide range of both hydrophilic and hydrophobic polymeric materials are suitable for use in the production of transmission holograms. In contrast, while a wide range of hydrophilic polymeric materials have been found to be suitable in the production of reflection holograms, it has proved exceedingly difficult to successfully introduce holographic reflection gratings into hydrophobic polymeric materials, thus severely limiting the range of applications of reflection of Denisyuk-type reflection holograms. For example, polydimethylsiloxane (PDMS) is a hydrophobic polymer that possesses an extraordinary ability to swell in the presence of both liquid and/or gaseous low molecular weight hydrocarbons and organic solvents and thus is, theoretically, a particularly suitable candidate for use as the support medium in a holographic sensor. However, the techniques known to those skilled in the art of production of holographic sensors have not proved successful in introducing a Denisyuk reflection hologram into PDMS.

Laser-ablation techniques have been used to introduce a surface grating onto a support medium in the production of a transmission hologram (Yamada et al. Optics Express, 2002, Vol. 10, No. 21, pages 1173-1178 "Single femtosecond pulse holography using polymethyl methacrylate"). The term "laser ablation" is commonly understood to refer to the process of removing material from a solid (or occasionally liquid) surface by irradiating it with a laser beam. At low laser flux, the material is heated by the absorbed laser energy and evaporates or sublimates. At high laser flux, the material is typically converted to plasma. A femtosecond laser is used to fabricate transmission holographic gratings in transparent materials by two-photon absorption or multi-photon processes. The laser energy is typically focussed into a high energy spot of less than one millimeter. The interference pattern of fringes are recorded by removal of material from either the surface of the support medium or inside of the support medium, (thereby forming "volume gratings" as discussed above). As noted above, transmission holograms are fundamentally different to reflection holograms and, as is understood by those skilled in the art, techniques used to introduce diffraction gratings into a support medium to produce a transmission hologram are often unsuitable for introducing diffraction gratings into a support medium to produce a reflection hologram. In addition, a transmission hologram may, on occasion, be formed as an artefact on the surface of the support medium during the production of a Denisyuk hologram. These transmission holograms produce spurious grating effects of the surface of the support medium which adversely affect the clarity and hence applicability of the Denisyuk hologram.

SUMMARY OF THE INVENTION

The object of the present invention is to overcome the abovementioned problems associated with the production of sensors based on reflection holograms.

Accordingly, there is a provided a method for the production of a holographic sensor which comprises a support medium supporting a reflection hologram wherein the support medium interacts with its physical or chemical environment to create an optical response which is a change in one or more optical properties of the hologram, the method comprising the steps of:

a) Introducing a colloidal dispersion of a recording material into the support medium;

b) Ablating the colloidal particles of the recording material using a pulsed laser to form the holographic element in the support medium.

The term "recording material" should be understood to mean any material in which the standing-wave pattern created when the incident and reflected beams meet is preserved in 3-D. The standing-wave pattern is preserved in 3-D via layers of the recording material disposed throughout the support medium such that the hologram relies on diffractive reflection from the grains of recording material.

The colloidal particles of the recording material are ablated by the pulsed laser. In the context of the present invention, the term "laser ablation" should be understood to mean the disintegration of relatively large particles into smaller particles.

The ablation effect required is not on the surface of but inside of the support medium where the recording material particles, which are typically nanoparticle in size, are distributed. The ablation effect on an individual recording material particle is a key requirement of the present invention. Ideally, no laser energy is absorbed directly by the support medium. The laser energy consists of a high energy diffraction pattern spread over many millimeters, for example, between 4 and 30 mm.

In contrast to the most common use of laser ablation as described above, the production of a Denisyuk reflection hologram using laser ablation does not involve the removal of matter from the surface of the film. While the mechanism that enables the high energy pulse to record a permanent reflection diffraction grating inside of the support medium is not fully understood, it is thought that colloidal recording material particles are disintegrated into even smaller particles and these ablated material particles remain inside of the support medium. The disintegration of the colloidal material particles into even smaller particles is thought to change the absorption characteristics of the material. In addition, it is contemplated that the very high temperatures located at the material particles' position during the laser pulse may have a disintegrating effect on the support medium, thereby altering the refractive index of the support medium at that position. The above factors, either alone or in combination, are thought to contribute to the recording of a permanent reflection diffraction grating inside of the support medium.

Prior to exposure, the material particles are distributed randomly throughout the support medium as in a colloidal dispersion. However, after the exposure to the laser pulse, parts of the random dispersion have been converted to a holographic diffraction pattern. This conversion can be attributed to the contrast generated by the diffraction pattern in the high energy conditions of the pulse. Across the patterned area, the alternating light and dark fringe structure means that the material particles in the dark fringes are unaffected but the material particles in the light fringes are ablated. This is readily seen as a partial bleaching of the shade over the whole of the exposed area. It is well known to physicists involved in making holographic gratings that, during the recording process, there is a redistribution of the light intensity over the exposed area. The area of the light fringes ideally contains up to nearly four times the energy density of the original reference beam, while the area of the dark fringes ideally contains zero energy density due to the alternating constructive and destructive interferences.

Furthermore, the hologram is immediately visible in daylight or normal room lighting. It is therefore no longer necessary to process the holographic recording material in order to see the hologram, thereby obviating the long, tedious processing steps on the exposed support medium as described above.

In one embodiment of the method of production according to the invention, the support medium is a hydrophobic polymer.

The claimed method of production results in the introduction of a reflection holographic grating into the support medium. Introduction of a permanent reflection holographic grating into a hydrophobic polymer unlocks a vast range of sensor capabilities that were not possible when hydrophilic polymers were the only suitable support mediums. Analytes that do not create an optical response in a hydrophilic polymer but do create an optical response in a hydrophobic polymer are now detectable.

Preferably, the support medium is a synthetic polymer.

The synthetic polymer may be formed by free radical addition, anionic or cationic or condensation polymerisation.

Further preferably, the support medium is selected from siloxanes polystyrene, polyolefins (low density polyethylene, polymethylpentene, etc.), fluoropolymers (fluorinated ethylene-polypropylene, polytetrafluoroethylene, etc.), polyaramid, polycarbonates, acrylic polymers, methacrylates, styrenes and substituted styrenes, polysulfones, epoxies (grades of clear epoxy compounds such as 'aqualusion'), polyacrylonitriles, polyamides (nylon and polymers other than nylon), polyimides, polyvinylchloride, polyvinyldiene chloride, polyvinylacetals, polyesters, polyvinylesters, polyethers, polyvinylethers, polydiacetylenes, polyvinyl acetate, polyethylene terephthalate and polyethylene oxide, optionally with other polymerizable monomers or cross-linkers.

Still further preferably, the support medium is polydimethylsiloxane (PDMS).

PDMS possesses an extraordinary ability to swell in the presence of both liquid or gaseous low molecular weight hydrocarbons and organic solvents. Accordingly, there has been a desire for some time to develop a holographic sensor wherein PDMS is the support medium. Many attempts have been made by the present inventors to introduce reflection holographic gratings into PDMS using many different techniques known to those skilled in the art, but to no avail. However, using the method of the present invention, it has proved possible to introduce reflection holographic gratings into PDMS. Use of PDMS as the support medium in the production of a reflection holographic sensor results in a sensor that is capable of detecting and quantifying low molecular weight hydrocarbons such as butane and propane in the surrounding atmosphere or organic solvents such as petroleum spirit, chloroform or benzene in the atmosphere or in a liquid stream. Furthermore, the detection rate is exceptionally rapid, typically less than 5 seconds.

Alcohols and polar solvents do not swell the support medium to the same extent as low molecular weight hydrocarbons or apolar organic solvents. Water does not swell PDMS at all but its presence at low levels can drastically reduce the ability of alcohols or other hydrophilic solvents to swell PDMS. Consequently, a PDMS holographic sensor can be used to rapidly measure the water content of alcohols, ketones, ethers, or other hydrophilic solvents.

In a further embodiment of the method of production according to the invention, the support medium is a hydrophilic polymer.

The claimed method of production can also be used to introduce reflection holographic gratings into hydrophilic polymers, producing reflection holographic sensors that are of at least equal quality to reflection holographic sensors produced according to methods known in the art.

Preferably, the support medium is a natural polymer.

Further preferably, the support medium is gelatin, starch or agarose.

Preferably, the support medium is a synthetic polymer.

Further preferably, the support medium is selected from polyvinyl alcohol, polyvinylpyrrolidone, acrylic polymers (polyhydroxyethyl acrylate, etc.), methacrylates and related polymers (polyhydroxyethyl methacrylate, etc.), polyacrylamides, polymethacrylamides, homopolymers or copolymers of polymerisable derivatives of crown ethers, and esters of or co- or terpolymers of polyhdroxyethyl acrylate, polyhydroxyethyl methacrylate, polymethacrylamide or polyacrylamide, optionally with other polymerizable monomers or cross-linkers.

In a further embodiment of the method of production according to the invention, the polymer is cross-linked.

The polymer solution may include chemical cross-linking agents in order to render the cured polymer tough and insoluble. Alternatively, the dried polymer may be subsequently immersed in a bath of cross-linking agent to render it insoluble.

Suitable recording materials are those which preferably have a high absorptance, in particular at the recording wavelength. Absorptance is the ratio of the total absorbed radiant or luminous flux to the incident flux. The absorptance of a material defines the extent to which a material absorbs energy and, in the case of the present invention, light energy. Materials that have a high absorptance absorb light energy effectively whereas materials that have a low absorptance do not absorb light energy effectively. By definition, in the case of a blackbody (a theoretical object that is both a perfect absorber and a perfect radiator of electromagnetic radiation) absorptance equals 1.0. Materials having an absorptance approaching 1.0 are particularly suitable for use as recording materials in the method according to the invention. Conversely, materials having an absorptance approaching zero are particularly suitable for use as the support medium in the method according to the invention as, ideally, no laser energy is absorbed directly by the support medium.

Of course, high absorptance is not the only parameter that must considered. The recording material must undergo a physical transition as a result of absorbing the energy from the laser source, for example, disintegration.

In a further embodiment of the method of production according to the invention, the recording material is a metal.

Preferably, the recording material is selected from silver, gold, copper, tin, iron, nickel and lead.

Metals, and particularly, the metals recited above have a high absorptance. The high absorptance of the above metals means that these colloidal metal particles absorb the energy of the laser effectively and disintegrate into smaller particles thereby forming the reflection holographic grating in the support medium as described above.

In this regard, it has been noted on occasion that the holographic image appears to get brighter a few minutes after the laser exposure. It is contemplated that this effect may be due to the extremely high reactivity of ablated metal particles, which may only be a few atoms in size. In this form even noble metals like gold and silver can rapidly oxidize. The oxidized nano particles would be expected to have a high refractive index compared to the low refractive index of the surrounding support medium.

In a further embodiment of the method of production according to the invention, the colloidal metal dispersion is prepared in situ by diffusion of a solution of a metal salt into the support medium and subsequent chemical reduction of the metal salt to form the colloidal metal dispersion.

Diffusion of the metal salt into the support medium is carried out in accordance with the procedures disclosed in WO-A-99/63408. The reduction of the metal salt to form small grains of colloidal metal within the support medium is essential to the method of the present invention. The metal salt is reduced to form a colloidal metal dispersion in the support medium using any suitable reducing agent. Suitable reducing agents include, but are not limited to, hydroquinone, and other photographic developers well known to those skilled in the art of photographic development using silver salts. In the case of metals that are more reactive (less electronegative) than silver, more powerful reducing agents are needed such as lithium borohydride or sodium borohydride or lithium aluminium hydride in ether. The reducing agent selected depends on the electronegativity of the metal ion in the metal salt introduced into the support material. The reducing power of hydroquinone can be increased by the addition of alkaline agents. Particular advantages come from using volatile amines such as triethylamine and isopropylamine. Amines such as these and also ammonia vapour have the advantage that they are volatile and therefore can penetrate the polymer film as a vapour. In contrast, the concentration of the metal salt in the support medium prior to reduction would be adversely affected if the alkaline agents are in liquid form. Triethylamine and isopropylamine are particularly suited for penetration into PDMS.

There are other further methods of introduce the colloidal metal particles into the support medium. For example, a colloidal suspension of metal particles is contacted with the medium, causing the particles to diffuse into the medium. This is thought to be most useful when the support medium is a macroporous polymer so that the metal nanoparticles can move freely in the medium. The colloidal metal suspension may be produced by the reduction of a metal salt in a liquid medium, or using commercially available preparations.

An alternative contemplated method involves mixing a colloidal suspension of metal particles with a solution of the polymer, the mixture is coated on top of a substrate for example glass plate or plastic film and then dried. Coating may be carried out by well known methods, such as spin coating, wire or Meyer bar coating, and various types of roll coating.

In a further method, a solution comprising the metal salt and polymer is prepared, and is coated as described above. As the mixture dries out the coating is treated with reducing agent to form the metal particles.

The final method that is contemplated involves preparing a solution comprising the colloidal metal particles and monomer components and thereafter casting and polymerising thereby causing the metal particles to become distributed in the polymer.

In an alternative embodiment of the method of production according to the invention, the colloidal metal dispersion is pre-prepared by chemical reduction of a solution of a metal salt and subsequently introduced into the support medium by diffusion.

The metal salt is chemically reduced by a suitable reducing agent to form a solution of colloidal metal particles. The colloidal metal is introduced into the support medium by bringing the colloidal metal salt solution into contact with the support medium before the colloidal metal particles precipitate thus allowing the colloidal metal particles to diffuse into the support medium. Pre-preparation of the colloidal metal dispersion has the advantage of greater control over the reduction process and, hence, greater control over the amount of colloidal metal produced and introduced into the support medium.

Preferably, the concentration of the metal salt solution is between 0.1 M and 0.5M.

The optimum concentration of the metal salt solution has been found to lie between 0.1M and 0.5M. However, the required concentration of the metal salt solution will vary depending on the metal selected and can conceivably be lower or higher than the above limits. The skilled person can be reasonably expected to experiment in order to identify the optimum concentration of the appropriate metal salt solution without departing from the scope of the present invention.

The above-mentioned metals were also selected for use in the method of the present invention because many of the salts of these metals are easily reduced to form the respective colloidal metal dispersions in the support medium.

Most salts of the above metals are suitable for the purposes of the present invention. The two most important characteristics of the salts are:
i) They are soluble in the solvent of choice, thereby facilitating diffusion into the support medium; and
ii) They are easily reduced to form the respective colloidal metal dispersion.

The metal salts are reduced to form a colloidal metal dispersion in the support medium using any suitable reducing agent. For example, a silver salt such as silver perchlorate or silver pentafluoropropionate in dry tetrahydrofuran (THF) is diffused into a film of PDMS cured resin and subsequently reduced using a mild reducing agent such as hydroquinone to form a colloidal silver dispersion in the cured PDMS resin.

In a further embodiment of the method according to the invention, the recording material is a pigment.

Pigments having a high absorptance are also suitable for use in the method according to the invention. The colloidal dispersion of the pigment is introduced to the support medium by immersing the support medium in a suspension of the pigment or by forming a colloidal suspension of the dye pigment in the support medium and casting a film. The high absorptance of the pigment means that these colloidal pigment particles absorb the energy of the laser effectively and disintegrate into smaller particles thereby forming the reflection holographic grating in the support medium as described above.

Particulate pigments of dyes having a high absorptance are suitable for use in the method according to the invention.

Preferably, the recording material is selected from Negrosine and Aniline Black.

In a further embodiment of the method according to the invention, the pulsed laser is a Neodymium-doped yttrium aluminium garnet (Nd:YAG) laser.

Usually, laser ablation refers to removing material with a pulsed laser, but it is possible to ablate material with a continuous wave laser beam if the laser intensity is high enough and a high speed shutter system is used. For the purposes of the present invention, it is preferable for the laser to be a pulsed laser. A pulsed laser is capable of depositing a much greater energy at a given point on the support medium in as short a time as possible. Laser pulses can vary over a very wide range of duration (milliseconds to femtoseconds) and fluxes, and can be precisely controlled.

Neodymium-doped yttrium aluminium garnet (Nd:$Y_3Al_5O_{12}$)(Nd:YAG) is a crystal that is used as a lasing medium for solid-state lasers. Nd:YAG lasers typically emit light with a wavelength of 1064 nm in the infrared region of light. However, there are also transitions close to 940 nm, 1120 nm, 1320 nm and 1440 nm. Nd:YAG lasers operate in both pulsed and continuous mode. Pulsed Nd:YAG lasers are typically operated in the so-called Q-switching mode: An optical switch is inserted in the laser cavity waiting for a maximum population inversion in the neodymium ions before it opens. Thereafter, the light wave can run through the cavity, depopulating the excited laser medium at maximum population inversion. In this Q-switched mode, output powers of 20 megawatts and pulse durations of less than 10 nanoseconds are achieved. The high-intensity pulses may be efficiently frequency doubled to generate laser light at 532 nm, or higher harmonics at 355 nm and 266 nm.

Preferably, the pulsed laser is a frequency doubled Nd:YAG laser with a 532 nm output.

Further preferably, the pulsed laser has a total energy output per pulse of at least 300 mJ of 532 nm light.

For optimum results, an approximately 1-3 cm diameter spot from the frequency doubled Nd:YAG laser is used to ablate the colloidal metal particles dispersed in the support medium for a period of 6 ns. Over that area and length of time, the power density applied to the support medium is approximately 7 MW/cm$^2$ watts. This high power density acting on the colloidal metal particles creates a permanent reflection diffraction grating without any further processing being required.

The power density of approximately 7 MW/cm$^2$ watts is the lowest power density that has worked with silver particles. For other materials such as iron, a power density that is approximately 5 times higher is required in order to obtain the desired results.

Preferably, the pulsed laser is a frequency tripled Nd:YAG laser with a 355 nm output.

Further preferably, the pulsed laser has a total energy output per pulse of at least 150 mJ of 355 nm light.

The total energy output per pulse is reduced by use of a frequency tripled Nd:YAG laser with a 355 nm output. In such a case, reduction of the spot size of the laser to approximately 4 mm is necessary so that a sufficiently high energy density is applied to the colloidal metal particles.

Where the grating is used as a sensor which will swell in the presence of an analyte, it is preferable to make the grating with the frequency tripled mode of the Nd:YAG laser operating at 355 nm because when the analyte to be detected is an organic solvent, the reflection diffraction grating will swell into the visible range of light, for example, green light at 550 nm, and when the analyte to be detected is a hydrocarbon, the reflection diffraction grating may swell into the red region of light (600 nm) depending on the concentration of analyte present.

Preferably, the pulsed laser is a Nd:YAG laser with a 1064 nm output.

Further preferably, the pulsed laser has a total energy output per pulse of at least 300 mJ of 1064 nm light.

Preferably, the pulsed laser is a ruby laser with a 694 nm output.

In a further embodiment of the method according to the invention, the ablated metal particles have a grain size substantially less than the wavelength of light used for the pulsed exposure.

Before exposure to the pulsed laser, the colloidal metal particles do not necessarily need to be smaller than the wavelength of laser light used. However after ablation of the metal particles by the pulsed laser, the metal particles in the light fringes are transformed to a state substantially smaller than the wavelength of light used.

Preferably, the colloidal metal particles ablated by the pulsed laser have a grain size of no more than 50 nm.

Preferably, the colloidal metal particles ablated by the pulsed laser have a grain size of no more than 10 nm.

In a further embodiment of the method according to the invention, the change in one or more optical properties of the hologram is caused by a variation in a physical property of the support medium.

Preferably, the physical property is the size, shape, density, viscosity, strength, hardness, hydrophobicity, hydrophilicity, swellability, integrity or polarisability of the support medium or charge distribution in the support medium.

Variation(s) of the, or each, physical property, in turn, causes a variation of an optical property, such as reflectance, refractance or absorbance of the holographic element.

The physical property may be the size of the support medium.

The physical property of the support medium which varies is its size or volume. The size or volume of the support medium may be varied upon absorption of, or removal of, an analyte to be detected, for example, a liquid or gas.

The physical property may be the spatial integrity of the support medium.

The physical property of the support medium which varies is the spatial integrity of the support medium. The integrity of the support medium may be varied by chemical or biochemical action of an analyte to be detected on the support medium.

The physical property may be the extent of modulation of the refractive index disposed throughout the medium.

The physical property of the support medium which varies is the ability of the support medium to support a regularly-spaced distribution of complex index of refraction. This physical property may be varied by chemical or biochemical action of an analyte to be detected on the support medium.

There is also provided a method for the detection of an analyte which comprises, contacting the analyte with a sensor produced by the method according to the invention, and detecting any change of an optical characteristic of the holographic element of the sensor.

When an analyte to be detected comes into contact with the sensor produced by the method according to the invention, a change in one of the physical properties of the support medium will be induced. The interaction of the analyte (any physical, chemical or biological stimulus) with the support medium will generate observable changes in the wavelength (i.e. colour), intensity (brightness) or encoded image of the reflection hologram.

In one embodiment of the method of detection according to the invention, the change of an optical characteristic of the holographic element is detected as a colour change of the holographic element or of the reflection grating.

The colour change is caused by a change in the reflected wavelength. The change in the reflected wavelength can be within or outside of the visible spectrum of light, i.e. the colour change may or may not be visible to the human eye. In cases where the change in the reflected wavelength is outside of the visible spectrum of light, the colour change may be detected by other means such as a spectrometer. Alternately the absence of visible colour may provide an indication of the presence or absence of the analyte.

In a further embodiment of the method of detection according to the invention, the change of an optical characteristic of the holographic element is detected as an intensity change of the holographic element.

In a further embodiment of the method of detection according to the invention, the change of an optical characteristic of the holographic element is detected as a change in the characteristics of the non-ionising radiation reflected by the reflection grating or the holographic fringes of the element. For example, the characteristics of the non-ionising radiation may be the angle of reflection, the wavelength or the colour.

In a further embodiment of the method of detection according to the invention, the change of an optical characteristic of the holographic element is detected as a change in the angle of light emitted the holographic element.

In a further embodiment of the method of detection according to the invention, the analyte is a hydrocarbon.

Preferably, the hydrocarbon is a low molecular weight hydrocarbon selected from ethane, ethene, ethyne, propane, propene, propyne, butane, butene and butyne, or any combination thereof.

The above hydrocarbons are preferred analytes. However, the analyte may be any alkane, alkene, alkyne or cycloalkane, cycloalkene, cycloalkyne of varying length or size.

Further preferably, the hydrocarbon is a hydrocarbon fuel.

Examples of suitable fuels are petrol, diesel, kerosene, and Avgas.

In a further embodiment of the method of detection according to the invention, the analyte is benzene or derivatives thereof or hexane or derivatives thereof.

In a further embodiment of the method of detection according to the invention, the analyte is oxygen, carbon monoxide, a nitrogen oxide, a sulphur oxide, acetone, formaldehyde, a ketone, methane, hydrogen cyanide or ozone.

In a further embodiment of the method of detection according to the invention, the sensor includes an enzyme that interacts with the analyte to produce a detectable physical or chemical change.

In a further embodiment of the method of detection according to the invention, the analyte is an enzyme and the sensor includes a substrate of the enzyme and interaction of the enzyme with the analyte produces a detectable physical or chemical change.

DETAILED DESCRIPTION OF THE INVENTION

Figure 1:
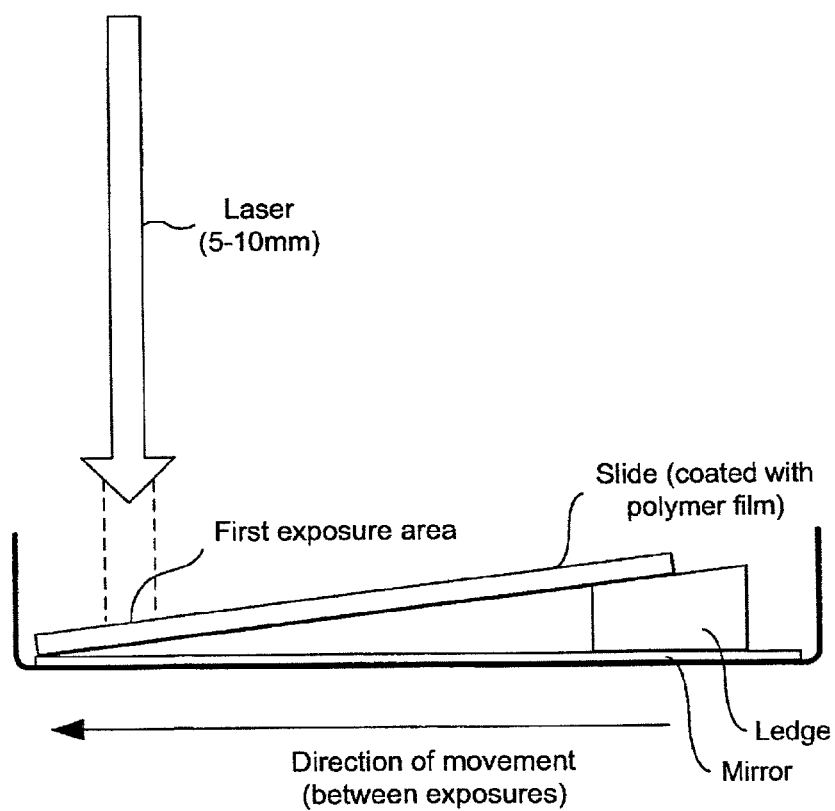
FIG. 1 is an elevation view of the recording set-up to produce a holographic reflection grating by the method of production of a holographic sensor according to the invention.

The invention will be further illustrated by the following description of embodiments thereof, given by way of example only with reference to the accompanying drawings.

The invention optionally uses as its support a transparent glass or plastics slide which has been pre-treated or "subbed" to improve the adhesion of the overlying polymer layer which will support the holographic structure. The nature of the pre-treatment depends on the slide material and the polymer that will overlay it. Many techniques are known to those skilled in the art, including silanisation of glass and U.V., thermal or chemical bonding of thin polymer layers to the surface. The most appropriate method is chosen for the combination of materials being used.

A film of the polymer of interest for a particular sensing application is then deposited on top of the pre-treated slide using a Mayer bar method. Typically, the bar is a 1 cm diameter rod on which a 0.5 mm diameter stainless steel wire was close-wound in one layer and welded in place. The polymer is typically any that has a regular structure of the type comprising, say, at least 50 or 100 repeating units, whether a homopolymers or copolymer. The polymer can be hydrophobic or hydrophilic, natural or synthetic.

Typical hydrophobic polymers for use in this invention are selected from the synthetic polymers siloxanes, in particular, PDMS, polystyrene, polyolefins (low density polyethylene, polymethylpentene, etc.), fluoropolymers (fluorinated ethylene-polypropylene, polytetrafluoroethylene, etc.), polyaramid, polycarbonates, acrylic polymers, methacrylates, epoxies (grades of clear epoxy compounds such as 'aqualusion'), polyacrylonitriles, polyamides (nylon and polymers other than nylon), polyimides, polyvinylchloride, polyvinyldiene chloride, polyvinylacetals, polyesters, polyvinylesters, polyethers, polyvinylethers, polydiacetylenes, polyvinyl acetate, polyethylene terephthalate and polyethylene oxide, optionally with other polymerizable monomers or cross-linkers. Typical hydrophilic polymers for use in this invention are the natural polymers gelatin, starch or agarose and the synthetic polymers polyvinyl alcohol, polyvinylpyrrolidone, acrylic polymers (polyhydroxethyl acrylate, etc.), methacrylates and related polymers (polyhydroxyethyl methacrylate, etc.), polyacrylamides, polymethacrylamides, homopolymers or copolymers of polymerisable derivatives of crown ethers, and esters of or co- or terpolymers of polyhdroxyethyl acrylate, polyhydroxyethyl methacrylate, polymethacrylannide or polyacrylamide, hydroxylated polyamides, optionally with other polymerizable monomers or cross-linkers.

The polymer solution used for coating the pre-treated slide may have chemical cross-linking agents included, in order to render the resulting film tough and insoluble after curing, or the dried film may subsequently be immersed in a bath of a cross-linking agent to render it insoluble. A typical example of this procedure comprises coating an aqueous polyvinyl alcohol (PVA) solution containing a small amount of glutaraldehyde and a trace of acid catalyst to make a stable cross-linked PVA film.

In an alternative approach to making the polymer film, a mixture of appropriate polymerizable monomers can be mixed with thermal, U.V. or visible light initiators and optionally with solvents, and polymerised in situ on top of the substrate. Typical examples of this approach utilise co- or ter-polymers of acrylate, methacrylate or acrylamide-based monomers, preferably mixed with a certain amount of cross-linker to give a stable insoluble film capable of supporting a holographic structure within it.

Regardless of the film formation method, and after curing procedures, a stable polymer film can be obtained, that adheres to the substrate. The dry thickness of the film is typically 5 to 50 μm, preferably approximately 20 μm, although it could be thinner or thicker if appropriate.

After film formation, the slide is optionally washed with a suitable solvent to remove any soluble residues, and may be subjected to further chemical derivatisation steps if appropriate, before proceeding with the incorporation of the metal salts and construction of the holographic structure within the polymer.

For example, where the polymer is PDMS and the metal salt to be diffused into the polymer matrix is silver pentafluoropropionate (AgPFP), the slide is first immersed in a 2.2% or 0.2M solution of hydroquinone in tetrahydrofuran (THF) for approximately 45 seconds. Thereafter, the slide is treated with a 2.7% or 0.1M solution of AgPFP in THF. Typically, a 0.2 ml blob of solution is placed onto a horizontal flat clean surface and the PDMS side of the slide is placed down onto the blob of AgPFP in THF. The blob of AgPFP in THF is then spread evenly over the surface of the PDMS on the slide. The slide is left in place for approximately 45 seconds before being removed and dried under a tepid air flow in a fume hood. A slight yellowing of the PDMS will be evident due to the slight reduction of the silver pentafluoroproionate to from a colloidal silver dispersion in the PDMS.

The control of the amount of colloidal silver generated in the polymeric support medium and its grain size is a crucial aspect of this invention. If too little silver is formed in the polymer, there will be insufficient absorption to form a reflection grating by laser ablation. If too much colloidal silver is generated in the polymer, the slide becomes too opaque to allow sufficient light to pass through the film to the mirror or other object so that the light can be reflected back to form the reflection grating fringe structure. However, this problem can be overcome by using a series of rapid laser pulses. The initial pulse or pulses make the slide more transparent enabling the later pulses to be more effective in allowing the returning object beam light to form a grating by ablating the colloidal metal particles to form a holographic reflection grating pattern in the polymer.

The colloidal metal salt particles are treated with an appropriate reducing agent in order to form a colloidal metal dispersion in the polymer. Silver salts such as silver pentafluoropropionate and silver nitrate are easily reduced to the base metal by mild reducing agents such as hydroquinone. However, ferrous or ferric salts, cobalt, copper, lead and tin salts, due to the greater chemical reactivity and propensity to oxidise of the metal, require stronger reducing agents such as lithium or sodium borohydride.

For example, a silver salt such as silver perchlorate or silver pentafluoropropionate in dry THF (tetrahydrofuran) is diffused into a film of PDMS cured resin. The silver salt is then reduced to form a colloidal silver dispersion in the cured PDMS resin using a mild reducing agent such as hydroquinone in THF.

Continuing with the above example, the AgPFP is treated with a mixture of three parts dichloromethane (DCM) to one part triethylamine (TEA) to form a colloidal silver dispersion in the PDMS. The mixture of DCM and TEA is contained in a transparent glass jar and the level of the mixture in the jar only covers the base of the jar. The middle of the lid of the jar has a slit tailored such that the slide can just be posted through the slit and withdrawn easily without actually being wetted by the mixture at the base of the jar.

The constituents of the mixture are volatile at room temperature. Therefore, when the slide is posted through the slit, the slide darkens rapidly as it encounters the TEA vapour. The DCM acts as a swelling aid on the PDMS layer which increases the penetration rate of the TEA vapour. By inspection through the glass, it is possible to ascertain the amount of colloidal silver produced. Preferably, the PDMS on the slide will display a deep yellow/brown colouration but without the reaction going too far. The deep yellow/brown colouration can be achieved in as little as seconds, after which the slide is removed from the glass jar and immediately rinsed in an acetone bath to remove most of the fugitive reactants to leave just PDMS and colloidal silver dispersion therethrough. Upon rinsing in the acetone bath, some of the colloidal silver can leach out of the PDMS, which is indicated by a partial lightening in the colour of the slide. Failing to rinse the fugitive reactants from the slide can adversely affect the laser ablation of the slide.

There are a number of different ways of carrying out the reduction step of the process.

i) Diffusion of the AgPFP into the medium. It has been found that where the medium is PDMS, spontaneous reduction of the salt to silver can take place;
ii) Simultaneous diffusion of AgPFP and a mild reducing agent such as hydroquinone (HQ) into the medium;
iii) Sequential diffusion of AgpFP and HQ into the medium in either order. Diffusion of HQ and then AgpFP was found to be better.
iv) Diffusion of HQ with TEA in THF solvent followed by drying enhances the reducing power.
v) Diffusion of AgPFP followed by HQ and then treatment with TEA vapour. The hydroquinone begins the reduction of the salt to silver, then the use of vapour speeds up this process and a more complete reduction is achieved (which ablates to produce a brighter hologram).
vi) Diffusion of AgPFP followed by application of TEA as a liquid, and then addition of hydroquinone.
vii) Prepare a mixture of the hydroquinone and amine just before applying to the medium. In this case it is preferable to apply the mixture before adding the silver salt solution.

All these methods provide different density and size of the colloidal silver particles. As HQ is a mild reducing agent, more effective reduction is obtained in combination with an amine like TEA. This can be assessed visually, with the best results obtained when a dark amber colouration is present in the medium, signalling a dense dispersion of finely divided grains—see v) above. The drying rate and concentration influence the quality of the colloidal dispersion in the medium, and these can be determined by routine experimentation.

Upon reduction of the metal salt in the support medium to form a colloidal metal dispersion therein, the slide is placed in position for treatment with the pulsed laser as shown in FIG. 1. The slide is exposed to a single 6 nanosecond pulse from a Nd:YAG laser operating at 532 nm with a collimated (5-10 mm) beam. The slide is aligned off-set to a planar mirror by around 7 degrees, thus constructing an off-axis Denisyuk reflection hologram of a planar mirror as shown in FIG. 1. After exposure, the slide is moved in the direction shown in FIG. 1 and another area is exposed to the laser. Further exposures of the same slide are carried out until the entire slide has been exposed to the laser.

It is possible to obtain reflection holograms with this ablation system when the laser operates in the fundamental mode for 1064 nm, in the frequency doubled mode for 532 nm or in the frequency tripled mode for 355 nm. It is only possible to immediately obtain a visible hologram in the dry state if the hologram is made in an unswollen or uncontracted dry state using the frequency doubled mode for 532 nm. Use of the fundamental mode for 1064 nm and the frequency tripled mode for 355 nm result in holograms that are outside the normal visibility range. These modes either require holograms to be machine read or, in order that the holograms are visible to the naked eye, the support medium must be swollen after exposure in the case of the reflection hologram made with a 355 nm beam, or swollen before exposure in the case of a reflection hologram made with a 1064 nm beam.

Since the invention of the very first hologram there has been a distinct lack of means of recording Denisyuk reflection holograms due to the lack of suitable sensitizer dyes to make the silver salts sensitive to infra-red (IR) light. In addition, in the case of the photopolymer system, a free radical photopolymerization system is virtually impossible with IR light of this wavelength because the energy is insufficient to break typical carbon-carbon double bonds that exist in the monomers that make up the polymers. Now, however, the present invention allows Denisyuk reflection holograms to be made with IR light and be replayed in IR light. This feature of the present invention may have applications in covert security value.

The completed hologram can be used in any appropriate monitoring format. This could be a reflection spectrometer device, a dip-stick, a fibre-optic probe or a label. These are given by way of example only.

The sensors produced by the method of production according to the invention are no different to sensors based on reflection holograms produced by methods known in the art. Accordingly, the applications of the sensor produced by the method according to the invention are similar to those disclosed in the prior art. However, the fact that the sensors produced by the method of production according to the invention may comprise a hydrophobic support medium means that a much larger range of sensing applications are now possible. A number of these additional sensing applications, together with some of the more traditional sensing applications are described in the examples below.

The sensors produced by the method according to the invention operate on the basis that the support medium interacts with its physical or chemical environment to create an optical response which is a change in one or more optical properties of the hologram.

The selection or design of the polymer material from which the hologram is constructed is the key to the analyte-selective sensing abilities of the sensor produced according to the method of the invention. Many different selection or design approaches can be applied depending on the target analyte, a number of which are described here by way of example. However, it is stressed that the scope of the invention should be understood to be very broad and is not limited to the approaches described below.

For instance, the polymer can be selected such that the physical property of the support medium which varies is its volume. The analyte of interest changes the microenvironment around a selected polymeric support medium and causes the support medium to change its conformation, leading to a measurable volume change. This is demonstrated by Example 1 below, where addition of alkane gases, methane, ethane, propane and butane to a PDMS-based hologram causes a swelling of the fringes of the hologram resulting in an associated colour change that is detectable by a reflection spectrometer.

In gas and vapour sensing, hydrophobic or hydrophilic polymer backbones may be selected on the basis that the polymer has a good partition coefficient for the gas or vapour of interest. Ligands for oxygen such as Vaskas compound and ruthenium-phenanthroline complexes may be added to the support medium for sensing oxygen. Other gases and vapours of interest include carbon monoxide, carbon dioxide, nitrogen oxides, sulphur oxides, benzene, formaldehyde, ketones (including acetone), methane, hydrogen cyanide and ozone.

For sensing hydrocarbons such as petroleum products and crude oil, food oils and lubricants, metal ions, phenolic compounds and benzene, sulphur and thiol related compounds, a hydrophobic polymer that is miscible with apolar solvents may be used. This is demonstrated by Examples 20 and 22 below.

Hydrophobic compounds can be detected in aqueous systems, such as blood and other biological fluids (detection of lipids, lipid complexes and other hydrophobic materials), beverages and food (detection of hydrophobic contaminants and oils, determination of fat content, etc.) and water (detection and determination of hydrophobic pollutants and hydrocarbons, lipids, hydrophobic fouling agents, etc.). The hydrophobic compounds can be detected by simple partitioning from the aqueous phase or the polymer selected can be functionalised such that specific hydrophobic materials are detected.

Alternatively, another approach is to select a polymer that degrades upon contact with the analyte of interest. This is demonstrated by Example 11 below, where addition of even minute quantities of moisture results in the degradation of the polyvinylalcohol (PVA) support medium. A sensor comprising PVA as the support medium is thus particularly useful in detecting the presence of moisture in a sample.

Yet another approach is to select a natural or synthetic polymer, or a design a mixture containing one or more such polymer(s), which can be degraded by an enzyme or a group of related enzymes. When the enzyme interacts with the polymer, the structural integrity of the polymer film is undermined, and the reflection spectrum of the hologram changes giving a signal. This is demonstrated by Example 19 below, wherein starch is used in the construction of the support medium to select for an enzyme α-amylase, which specifically degrades starch chains. By replacing the starch with other carbohydrates, the selectivity would be altered. Thus, dextran based holograms would select for dextranase and pullulan holograms would select for pullulanases and isoamylases. By using other types of polymers, other classes of enzymes may be targeted, such as proteases.

It is not necessary for the whole of the polymer structure to be degradable by the target enzyme. Only occasional linkages along the main chain of the polymer need to be cleavable, or alternatively, cross-linking sites can be targeted. This concept can be expanded upon by designing the support medium to include more cross-links, such as ones with peptide spacers containing cleavage sites for specific proteases. These designed synthetic polymer films may thus have specificity for particular proteases.

Alternatively, the enzyme may be immobilised on or in hydrophobic or hydrophilic matrices to produce sensors, affecting a change in the bulk medium or localised within the holographic matrix that is detected by a change in volume or refractive index of the hologram. Alternatively, a sensor can be produced such that enzyme inhibitors can be detected. For example, lipase enzymes may be detected by a change in the hologram brought about by the degradation of lipids causing a hydrophobic support medium to expand, or lipase inhibitors could be detected by introducing lipids to a hologram on which lipases are immobilised, a lack of response of the hologram being indicative that the enzyme is inhibited.

It has been found that enzymes immobilised physically in polymer medium preserve some activity during the polymerisation, silver diffusion and ablation steps of the method as show in the example below. Surprisingly the loss is greatest in the polymerisation step, so the possibility of creating sensors with immobilised enzymes for the detection of substrates or inhibitors becomes possible. Example 21 demonstrates how enzymes can be immobilised in the polymer medium.

Depending on the analyte, it may be desirable to incorporate in the sensor a material with which the analyte reacts, to cause a detectable change in situ. The detectable change may be chemical, e.g. a change in pH, or physical, e.g. a change in volume. By way of example, the analyte may react with or inhibit an enzyme in or on the sensor.

By coupling short peptide protease substrates to the polymer chains of the film, it may also be possible to create a response by a charge change mechanism. For instance, if the peptide was initially uncharged but created an immobilised charged group when cleaved by the protease, the increase in immobilised charge groups may cause the polymer film to swell, hence generating a response. The converse situation, where a charged group is removed by enzymatic cleavage, could also be exploited. In such a case, a contraction of the polymer film would be observed. This concept can also be extended to other classes of enzymes using appropriately designed substrates.

Sensors produced by the method of production according to the invention have been found to be useful in the detection of spores as demonstrated in Example 23.

Sensors produced by the method of production according to the invention are also useful are also useful in security applications. For example, certain polymers have properties such as elasticity (PDMS, some grades of clear epoxy, etc.), changes in image may be generated by squeezing or stretching the polymer in one axis, thus creating a swelling or contraction in another in which the hologram is visible. This is demonstrated in Examples 7 and 8 below.

Yet another approach involves the inclusion of a specific molecular receptor in the polymer structure thereby inducing volume changes in the polymer upon binding of the molecule in question. The response can arise by various mechanisms. Osmotic swelling may occur if charged groups are held in the polymer by the receptor. Alternatively, if binding of the analyte causes dimerisation of the receptor, this will tend to pull the receptors closer together and cause a contraction of the polymer film. Binding of the analyte to the molecular receptor may also cause twisting of the polymer chains or otherwise alter the molecular configuration within the polymer film, preferably the medium, such that a measurable volume change results.

More complex polymer materials may also be designed, where the structure is, at least in part, held together by an interaction between an immobilised analyte and a molecular receptor for that analyte. This generates physical cross-links in the polymer structure. Upon introduction of free soluble analyte, this will compete with the immobilised analyte for the binding sites in the molecular receptor, leading to a reduction in the physical cross-linking of the film and consequently to swelling. This approach may be used with a range of materials and analytes, particularly for antigen/antibody interactions, ligand/binding protein interactions and interactions of designed artificial receptors with analytes.

For realisation of the many designed materials that could be created for measuring particular analytes, the in situ polymerisation approach described above is preferred because of the ability to control and design the properties of the resulting polymer film. Specially designed immobilised substrates, receptor molecules, cross-linkers etc. can easily be synthesised and incorporated into films by copolymerisation with other suitable monomers. The degree of swelling can be controlled by alteration of the concentrations of monomers or cross-linkers in the system; hence the behaviour of a hologram can be fine-tuned to match the application, for example, with respect to sensitivity and dynamic range.

The invention is further illustrated by the following Examples.

Example 1

PDMS solution (Sylgard 184, Dow Corning) was prepared in accordance with the manufacturer's instructions. A ration of 10:1 (w:w) of polymer and hardener were thoroughly mixed at room temperature and allowed to stand for 30 minutes for any air bubbles to dissipate from the solution. The solution was then dispensed in 200 µl aliquots onto clean, glass microscope slides. The solution was spread evenly over the surface of the slides using the side of a pipette tip. The solution on each slide was then cured at 80° C. for 2 hours.

Alternatively, the slides can be prepared by placing a clean glass surface in position, dispensing the PDMS solution on the upper surface thereof and coating a layer of the solution using the Mayer bar method—the Mayer bar being a road of 1 cm in diameter, close-wound with a 0.2 mm wire. The glass sheet was then cured at 80° C. for 2 hours.

Next, 200 µl of a 0.1M silver pentafluoropropionate (AgPFP) solution in THF was dispensed onto the cured PDMS slide and allowed to diffuse evenly into the PDMS by constant spreading of the AgPFP solution across the surface of the slide with a pipette tip. The slide was then thoroughly dried in a stream of warm air (~40° C.) which leads to the precipitation of the silver particles within the film of PDMS. A slight yellowing of the PDMS was evident due to the slight reduction of the AgPFP to from a colloidal silver dispersion in the PDMS.

The AgPFP is further reduced to form a colloidal silver dispersion in the PDMS by exposure in a jar to a vapour of a mixture of dichloromethane (DCM) and triethylamine (TEA) in a ratio of 3:1 (v:v). By inspection through the glass, it is possible to ascertain the amount of colloidal silver produced. Preferably, the PDMS on the slide will display a deep yellow/brown colouration but without the reaction going too far. The deep yellow/brown colouration can be achieved in as little as seconds, after which the slide is removed from the glass jar and immediately rinsed in an acetone bath to remove most of the fugitive reactants to leave just PDMS and colloidal silver dispersion therethrough.

Upon reduction of the metal salt in the support medium to form a colloidal metal dispersion therein, the slide 10 is placed in position for treatment with the pulsed laser as shown in FIG. 1. The slide 10 was exposed to a single 6 nanosecond pulse from a Nd:YAG laser operating at 532 nm with a collimated (5-10 mm) beam. The slide 10 was aligned off-set to a planar mirror by around 7 degrees, thus constructing an off-axis Denisyuk reflection hologram of a planar mirror as shown in FIG. 1. After exposure, the slide 10 was moved in the direction shown in FIG. 1 and another area is exposed to the laser. Further exposures of the same slide were carried out until the entire slide had been exposed to the laser. The laser used was a Nd:YAG laser operating at 532 nm manufactured by, and sold under the mark "Brilliant B", by Quantel of France.

The slide 10 was removed and visually inspected for the best grating area so that 8 mm sections could be cut into segments using a diamond edged glass scorer for insertion into a twin-cell glass "flow-through" cuvette. The twin-cell glass "flow-through" cuvette contains two compartments connected through a small channel at the base. One of the segments of the slide, which contains a holographic reflection grating in the PDMS support medium, was inserted into one of the compartments and is glued to one of the cuvette walls with glue made from gelatin solution. A thick glass cover with two luer tapering holes fits over each compartment of the cuvette and is sealed onto the cuvette with glue made from gelatin solution. The twin-cell cuvette is left in an oven at 70° C. overnight to allow the glue to dry. The glass cover of the cuvette provides an air-tight fitting that allows gas samples to be injected into the cuvette using a 60 ml syringe and to sparge the cuvette with air using a similar syringe. The need to insert and glue the glass-backed segment to the cuvette wall with the gelatin glue meant that a standard "flow-through" cell could not be used due to the narrowness of the luer fitting.

The twin-cell cuvette was inserted into a reflection spectrometer and the holographic reflection grating in the PDMS support medium diffracts a green beam when illuminate with white light.

Figure 2:
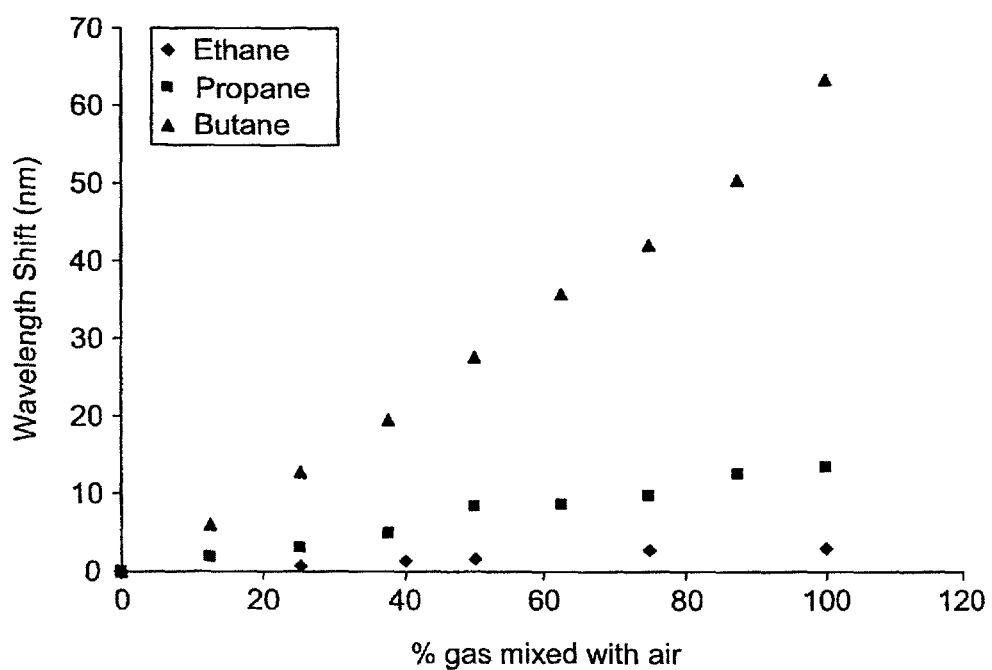
FIG. 2 is a graph of the sensitivity of a PDMS hologram produced by the method of production of the invention to ethane, propane and butane mixed with air.

Samples of methane, ethane, propane and butane, respectively, mixed with air, were injected into the twin-cell cuvette as described above. The sensitivity of the holographic reflection grating in the PDMS support medium to the respective mixtures is illustrated in FIG. 2. Methane is not included as the degree of swelling of the holographic reflection grating in the PDMS support medium was below the sensitivity threshold of the reflection spectrometer.

Figure 3:
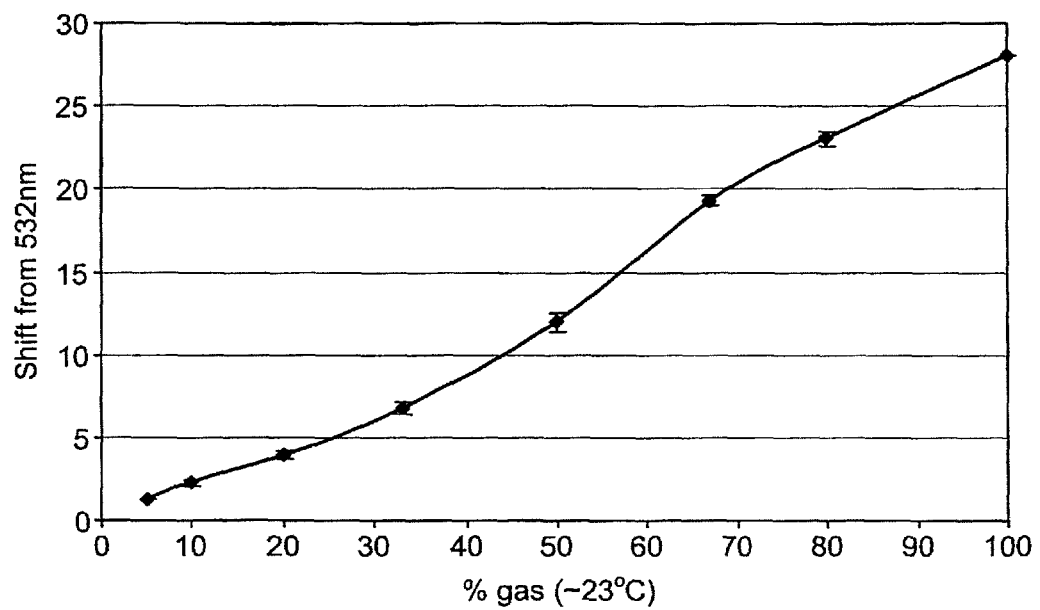
FIG. 3 is a graph of the sensitivity of a PDMS hologram produced by the method of production of the invention to butane/propane mixture in air.

FIG. 3 illustrates the sensitivity of the holographic reflection grating in the PDMS support medium to a mixture of 65% butane and 35% propane taken from a tin of gas used for domestic blowlamps.

The pronounced sensitivity of the holographic reflection grating in the PDMS support medium to ethane, propane and butane has many potential applications, the most obvious being in the area of Health and Safety where a sensor comprising PDMS supporting a reflection hologram can be used to detect gas leaks in, for example, an oil refinery.

Example 2

PDMS coated glass slides were prepared as described in Example 1. 200 µl of a 0.2M solution of hydroquinone in THF was dispensed onto a clean glass surface. The PDMS coated surface of the glass slide was placed on top of the hydroquinone solution of the clean glass surface and allowed to soak the hydroquinone solution for approximately 3 minutes. The slide was then removed and dried in a stream of cool air.

200 µl of a 0.1M silver pentafluoropropionate solution in THF was dispensed onto a clean glass surface. The PDMS coated surface of the slide was placed on top of the AgPFP solution and allowed to soak the AgPFP solution for approximately 3 minutes. The slide was then removed and dried in a stream of warm air until an amber-brown silver precipitate was visible.

Figure 4:
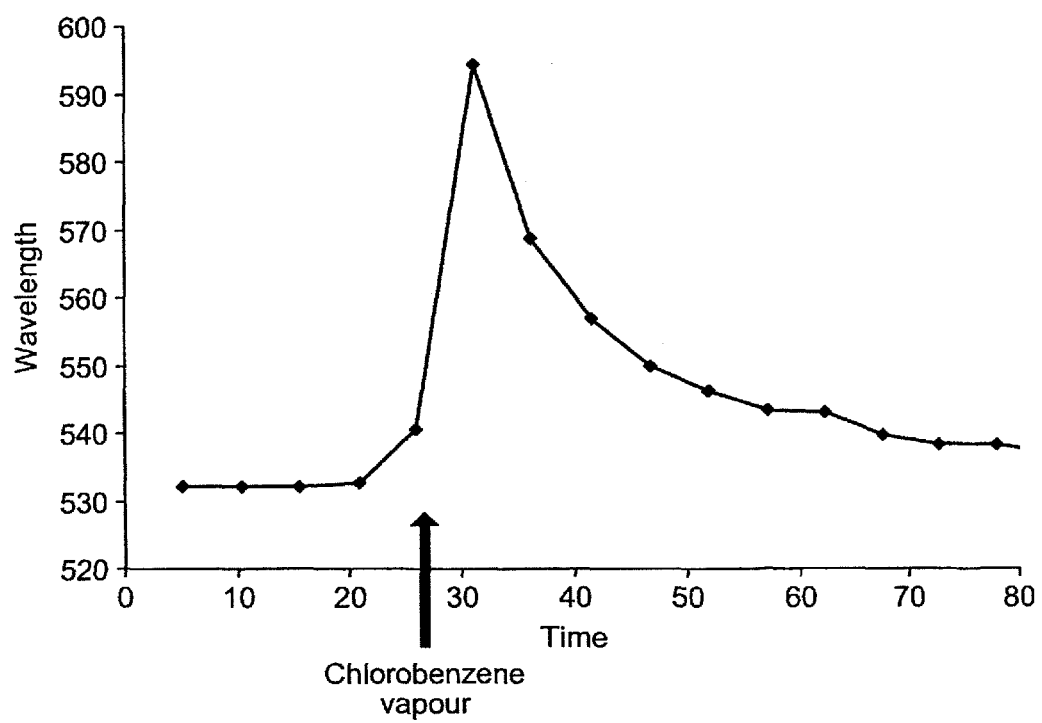
FIG. 4 is a graph of the sensitivity of a PDMS hologram produced by the method of production of the invention to chlorobenzene vapour.

The slide was exposed to a Nd:YAG frequency doubled laser beam for a period of 6 ns as per Example 1. A segment of the exposed slide was inserted into the twin-cell cuvette as described in Example 1 and chlorobenzene vapour (sample taken from a bottle of chlorobenzene at room temperature) was injected into the twin-cell cuvette. The sensitivity of the holographic reflection grating in the PDMS support medium to chlorobenzene is illustrated in FIG. 4.

Example 3

PDMS coated glass slides were prepared as described in Example 1. 200 µl of a 0.2M solution of hydroquinone in THF was mixed with 200 µl of a 0.1M solution of AgPFP in THF and subsequently dispensed onto a clean glass surface. The PDMS coated surface of the glass slide was placed on top of solution on the clean glass surface and the solution was allowed to perfuse into the PDMS film for approximately 3 minutes. The slide was then dried in a stream of warm air and exposed to the beam of laser light as described in Example 1.

Figure 5:
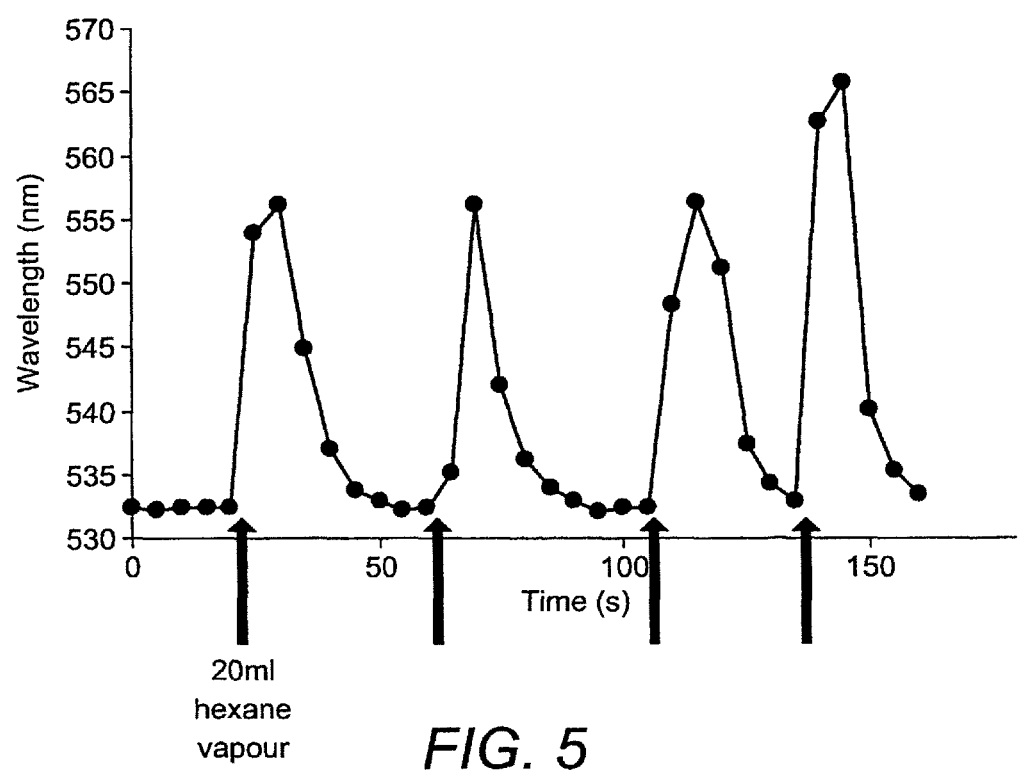
FIG. 5 is a graph of the sensitivity of a PDMS hologram produced by the method of production of the invention to hexane vapour.
Figure 6:
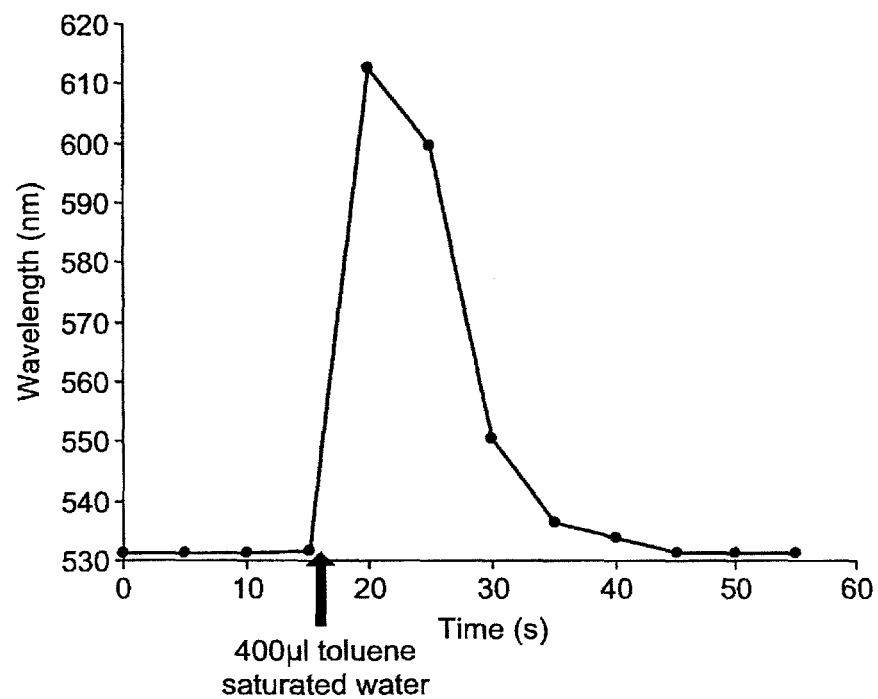
FIG. 6 is a graph of the sensitivity of a PDMS hologram produced by the method of production of the invention to toluene saturated distilled water.

The sensitivity of the holographic reflection grating in the PDMS support medium to hexane vapour and hexane saturated water is illustrated in FIG. 5. The sensitivity of the holographic reflection grating in the PDMS support medium to camping gas (6:4 butane:propane) is illustrated in FIG. 6.

Example 4

PDMS coated glass slides were prepared as described in Example 1 with the exception that only 50 µl of PDMS solution were applied to the surface of each slide. The remainder of the procedure in relation to production of the hologram in the PDMS support medium is as per Example 1.

Figure 7:
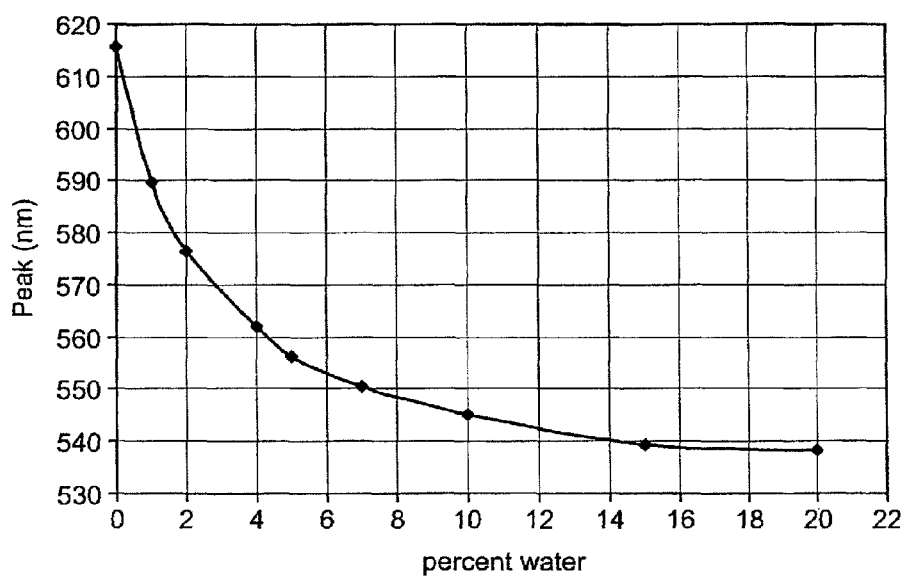
FIG. 7 is a graph of the sensitivity of a thin PDMS hologram produced by the method of production of the invention to water in ethanol.

Use of such thin PDMS slides allowed for rapid detection of ethanol and determination of the water concentration in ethanol (see FIG. 7). Holograms thus constructed were found to be exquisitely sensitive to water in solvents, with even a low percentage concentration of water causing a decrease in swelling of the holographic reflection grating.

Figure 8:
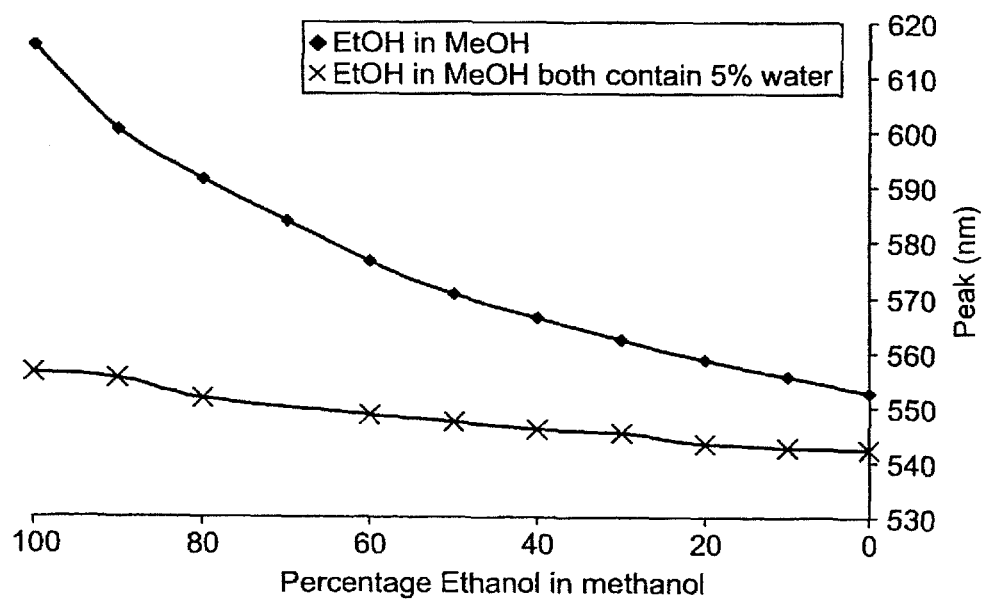
FIG. 8 is a graph of the sensitivity of a PDMS hologram produced by the method of production of the invention to a mixture of ethanol and methanol and to a mixture of ethanol (5% water) and methanol (5% water)
Figure 9:
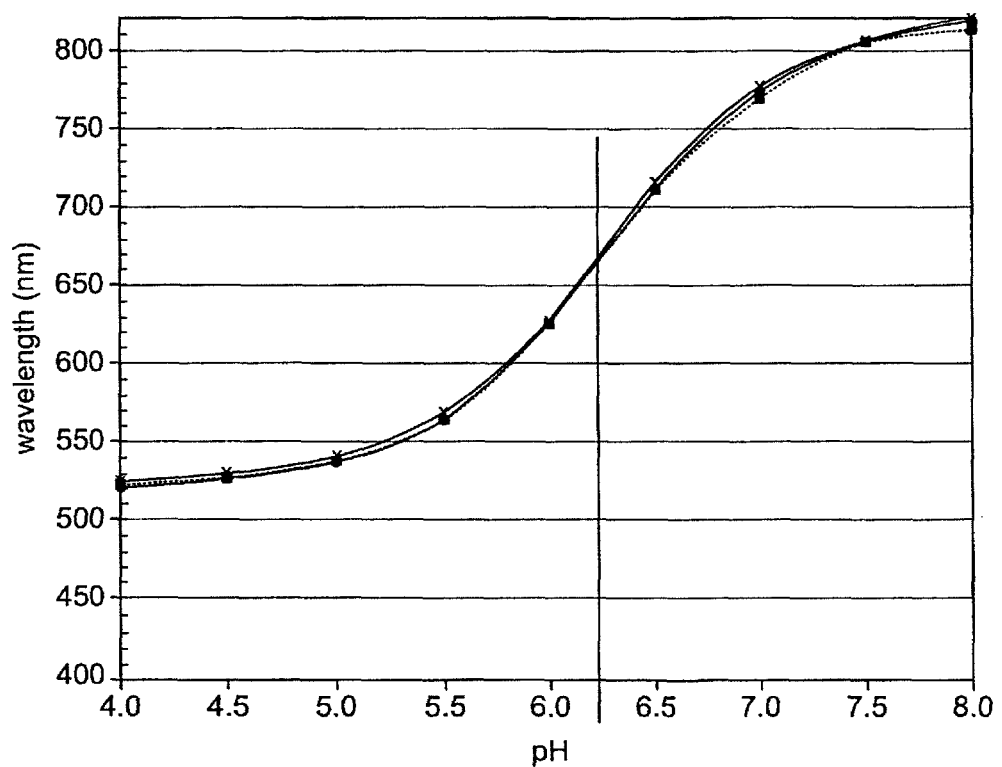
FIG. 9 is a graph of the sensitivity of a polyHEMA:EDMA:MAA hologram produced by method of production of the invention to variations in pH.

Further holograms were constructed by coating PDMS on glass and curing at room temperature for 3 days. A holographic reflection grating was produced in the PDMS support medium as per Example 1. The response of the holograms to a mixture of the ethanol and methanol, and to a mixture of methanol and ethanol containing 5% de-ionised (DI) water, is shown in FIG. 8.

Example 5

PDMS coated slides were prepared as per Example 1 and the slides were treated with hydroquinone and AgPFP as per Example 3. A photo-mask was prepared by photocopying an outline of numbers onto an acetate sheet. The photo-mask was placed onto the slide prior to exposure.

Exposure of the masked slide resulted in holograms being produced only in those areas that were not covered by the printed numbers on the acetate sheet, that is, if the whole area of the slide is black except for a number, which was left clear, then a hologram of the number is produced. This simple masking procedure was used to generate word and simple image holograms in the PDMS support medium.

Example 6

PDMS coated slides were prepared as per Example 1 and the slides were treated with hydroquinone and AgPFP as per Example 3. The remainder of the procedure in relation to production of the hologram in the PDMS support medium is as per Example 1 with the exception that either a single concave mirror or a surface comprising aligned, polished ball bearings (small convex mirrors) was used instead of a planar mirror.

The peak reflection of the resultant holograms was recorded as per Example 1. The initial peak reflection of the hologram at the centre of the concave mirror was 534 nm and the peak reflection at the edge of the concave mirror was 544 nm. The holograms were found to be responsive to the organic vapours, as per Examples 2 and 3.

Example 7

A PDMS solution was prepared as per Example 1. The PDMS solution was dispensed into a polystyrene Petri dish to a depth of 1 mm. The PDMS solution was cured in the Petri dish at 60° C. for 2 hours. After curing, the Petri dish was cracked and the sheet of cured PDMS was removed. A strip 6 cm×2 cm was cut from the middle of the cured PDMS and was pushed down onto the surface of a clean glass slide.

A hologram was constructed on the PDMS coated slide as per Example 3, the replay wavelength being measured at 534 nm. The PDMS layer was then removed from the glass slide, stretched (by holding either end between thumb and forefinger) and pushed, still stretched, back on to the slide. The wavelength was again measured, and found to be 491 nm. The stretched sample was then allowed to relax, and the wavelength re-measured at 534 nm. The sample was stretched and allowed to relax 10 times, on each occasion returning to its original reflection wavelength. Thus, the holograms displayed a wavelength response to various physical stimuli, such as stretching and pressure.

Example 8

Strips of PDMS of 1 mm in thickness were prepared and treated with hydroquinone and AgPFP as per Example 7. Prior to exposure, a strip was stretched between thumb and forefingers and pushed down onto a glass slide. The slide, with the PDMS strip in a stretched state, was then exposed to a beam of laser light as described in Example 1.

Upon removal from the slide, the PDMS strip returns to its relaxed state and, when illuminated by white light, was found to refract a red beam, having a replay wavelength of 654 nm. Upon stretching the hologram, the replay wavelength was found to be shorter but upon relaxation the hologram returned to the initial wavelength of 654 nm. Thus, the replay wavelength can be controlled using physical stretching of the polymer gel.

Example 9

A holographic reflection grating in silver metal was prepared in a polymethacrylic acid (PHEMA) coated slide thereby generating a dye sensitised silver halide emulsion in accordance with the procedure disclosed in WO-A-99/63408. The holographic reflection grating is clearly visible in an aqueous solution.

The dry slide was aligned for exposure to a Nd:YAG laser operating at 532 nm as per Example 1. The slide was allowed to settle in position for approximately 2 minutes and thereafter was exposed to the laser beam for 6 ns. Exposure to the laser produced a reflection grating in the PHEMA layer that was green in colour when exposed to white light. When the slide was placed in aqueous solution, the pre-existing reflection grating remained visible apart from the 1 cm diameter spot of the PHEMA layer which was ablated by the laser beam. The presence of the reflection grating formed by laser ablation of the silver halide particles had minimal effect on the brightness of the pre-existing reflection grating.

Upon drying the slide, the pre-existing reflection grating resides into the U.V. region while the reflection grating formed by laser ablation regained its visibility at 532 nm.

Example 10

Polymethacrylic acid slides were prepared as described in WO-A-99/63408 by free radical polymerisation with U.V. light. The cured PHEMA polymer contains 2.5 mol % EDMA and 6 mol % MAA.

300 μl of a 0.3M solution of silver perchlorate in isopropanol was dispensed onto a clean glass surface. The PHEMA coated slide was placed polymer side down onto the solution and allowed to soak the silver perchlorate for approximately 4 minutes. The slide was then removed and the polymer coated surface thereof was wiped with a cloth or tissue. The slide was then dropped into a solution of 5% (w:v) lithium bromide in 60% (v:v) methanol in water. After 10 minutes, the slide was immersed in a freshly prepared solution of 2% sodium borohydride in ethanol-water (1:1) causing immediate reduction of the silver bromide and any residual silver perchlorate to colloidal silver particles.

The slide was thoroughly rinsed in tap water and immersed in a 150 mmol phosphate buffer having a pH of 6.5 for 10 minutes, aligned and exposed to the Nd:YAG laser operating at 532 nm as per Example 1. The sensitivity of the resultant hologram to changes in pH is illustrated in FIG. 8.

Example 11

A 15% solution of polyvinylalcohol (PVA)(Moviol 3-83 manufactured by Hoechst, Darmstadt, Germany) was prepared in water. Acetic acid was added to adjust the pH of the solution to 4.0.

0.1 ml of a 0.5M hydroquinone solution was added and stirred into 1 ml of the 15% PVA solution. 0.1 ml of 0.3M silver nitrate was then added and stirred rapidly into the PVA-hydroquinone mixture. Over a period of approximately 2 minutes, the solution changed in colour from light yellow to dark brown as the proportion of silver colloid increased. The mixture was coated onto glass slides using a Mayer bar as described in Example 1. Certain slides were coated immediately, certain other slides were coated after a delay of 5 minutes and the remaining slides were coated after a delay of 4 hours. The slides that were coated immediately after preparation of the mixture were heated in a warm air stream. The change in colour of the dried PVA film from yellow to brown was monitored before aligning the slide for exposure to the laser beam. The slides that were coated after a delay of 5 minutes had a brown hue while the slides coated after a delay of 4 hours were noticeably darker and were visibly cloudy. As water and acetic acid evaporated from the slides, the hydroquinone in the reaction mixture caused a reduction of the silver nitrate to a colloid of silver particles. The acetic acid was required to mediate the rate of production of colloidal silver.

Holograms were produced by exposure to a Nd:YAG laser operating at 532 nm as per Example 1. The replay wavelength of the holograms was uniformly between 532 nm and 535 nm. The holograms were responsive to water vapour. The addition of water or buffer to the surface of the PVA support medium caused the immediate dissolution of the support medium and complete loss of the hologram. Even patterned application of even a small amount of moisture, for example, a fingerprint, was found to cause patterned loss of the hologram.

Further slides were prepared as described above with the exception that Moviol 66-100, a fully hydrolysed molecular weight type of PVA, was used in place of Moviol 3-83. These slides were prepared in order to compare the low molecular weight Moviol 3-83 PVA with high molecular weight Moviol 66-100 PVA. The holograms prepared in the high molecular weight Moviol 66-100 PVA were found to be essentially identical to the holograms prepared in the low molecular weight Moviol 3-83 PVA. Thus, it can be concluded that the molecular weight or the degree of hydrolysis of the PVA grade is irrelevant to the quality of hologram produced.

Example 12

A 4% solution of polyethylene oxide (PEO)(Molecular Weight ~600,000) was prepared in water:isopropanol (9:1). 100 µl of 0.3M silver chloride was added to 400 µl of the PEO solution, followed immediately by 100 µl of 0.5M hydroquinone. 100 µl aliquots of the resultant mixture were spread evenly onto the surface of clean glass slides. A colloidal suspension of silver particles was produced during drying. The slides were exposed to a Nd:YAG laser operating at 532 nm as per Example 1. The resultant holograms behaved in a similar fashion to the holograms produced in PVA in Example 11.

Example 13

Strips of cellulose dialysis tubing were cut up to form single film strips approximately 7 cm×2.5 cm (l×w) that could later be sandwiched between standard clear glass slides. The cellulose membranes were immersed in a 0.2M aqueous solution of ferrous chloride for approximately 1 minute. The membranes were then blotted on filter paper and dried in a tepid air flow.

0.4 g of sodium borohydride were dissolved in 100 ml of ice-cold de-ionized water to prepare a strong reducing solution. The dried membranes were immediately immersed in the reducing solution and darkened rapidly upon contact therewith. The darkening of the membranes was presumed to be due to the formation of very fine particles of reduced iron. In order to limit the risk of the colloidal iron particles immediately oxidising, the membrane strips were removed from the reducing solution with tweezers and dried as rapidly as possible in a strong blast of hot air. Despite the reducing solution still initially being present on the membrane to protect the colloidal iron particles from oxidising in air, considerable lightening or bleaching of the membrane occurred before the membrane was sufficiently dry to prevent rapid oxidation.

The membrane was sandwiched between standard clear glass slides and aligned for exposure to a Nd:YAG laser operating at 532 nm as per Example 1. It was found necessary to restrict the beam diameter to approximately 4 mm. The duration of exposure was 6 ns. It is probable that greater energy was required to obtain the necessary ablation effect from iron particles compared to silver particles.

Holographic reflection gratings were also prepared using the salts of other metals, rather than ferrous chloride. Thus, holographic reflection gratings were prepared by laser ablation of cobalt, copper, tin and lead particles. The metal salts used in the production of the holographic gratings were: 0.2M aqueous solution of cobalt chloride ($CoCl_2$); 0.1M aqueous solution of copper chloride ($CuCl_2$); 0.1M solution of tin chloride ($SnCl_2$) prepared in 0.1M hydrochloric acid; and 0.2M solution of lead perchlorate ($Pb(ClO_4)$).

The holograms were found to be responsive to the organic vapours, as per Examples 2 and 3.

Example 14

Polystyrene (Styrofoam) was dissolved in chlorobenzene solution (1:10; w:v) and 200 µl of this solution was dispensed onto clean glass slides. The chlorobenzene evaporated from the slides leaving a coating of clear polystyrene on the slides.

Figure 10:
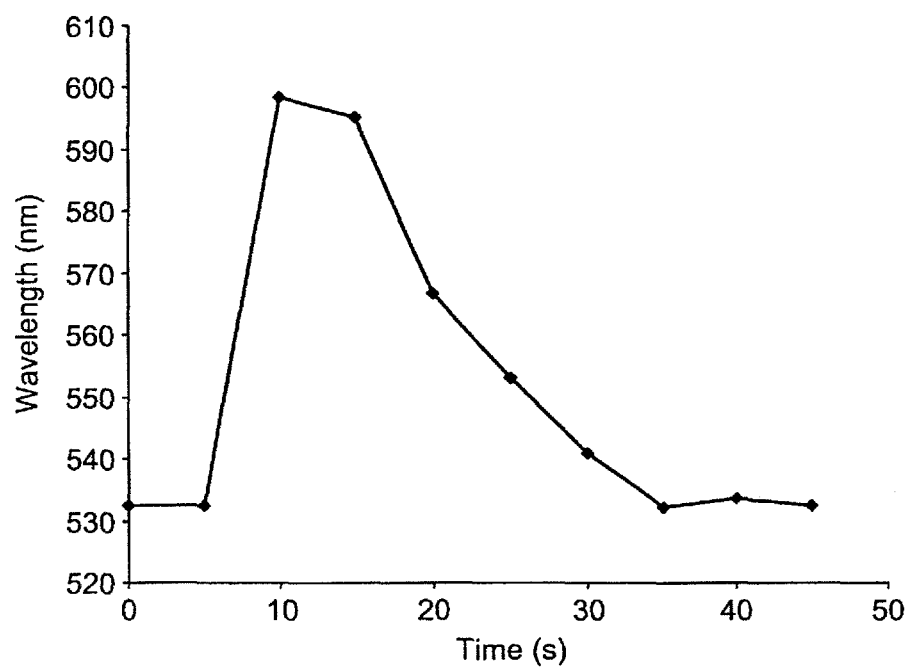
FIG. 10 is a graph of the sensitivity of a polystyrene hologram produced by the method of production of the invention to chlorobenzene vapour.

100 µl of a 0.2M solution of AgPFP in THF was dispensed onto the surface of the slide and allowed to dry. The slide was then exposed to an ethanolamine vapour which forms a colloidal silver dispersion in the polystyrene film. The slide was then exposed to a Nd:YAG laser operating at 532 nm as per Example 1. The sensitivity of the resulting hologram to chlorobenzene vapour (50 ml sampled from the headspace in a solvent bottle at room temperature) is illustrated in FIG. 10. The hologram expanded rapidly upon addition of the vapour, rapidly contracting to its original size upon addition of air.

Example 15

Low density polyethylene sheet of 50 µm in thickness was soaked in a 0.3M solution of AgPFP in THF in a tightly stoppered container at 30° C. for up to 20 minutes. Upon removal, the polyethylene sheet was dried in a stream of cool (room temperature) air and then soaked in a 0.5M solution of hydroquinone in THF for 40 minutes thereby forming a thin precipitate of silver in the polyethylene sheet. The polyethylene sheet was dried in a stream of warm air and positioned between two glass slides prior to exposure to a Nd:YAG laser operating at 532 nm as per Example 1.

The resultant hologram was completely irresponsive to water, alcohols, acetone and vapours produced from such. However, the hologram swelled slightly (from 533 nm to 569 nm) upon addition of chlorobenzene vapour but disappeared thereafter.

Example 16

PDMS solution was prepared as per Example 1 and added dropwise (approximately 10-30 µl at a time) to the surface of a clean glass slide. The slide was immediately placed in an oven to cure at 60° C. After curing, a silver precipitate was prepared in the now hemispherical droplets of PDMS as described in Example 3. The slides were rinsed in acetone prior to drying and were exposed to a Nd:YAG laser operating at 532 nm as per Example 1.

Figure 11:
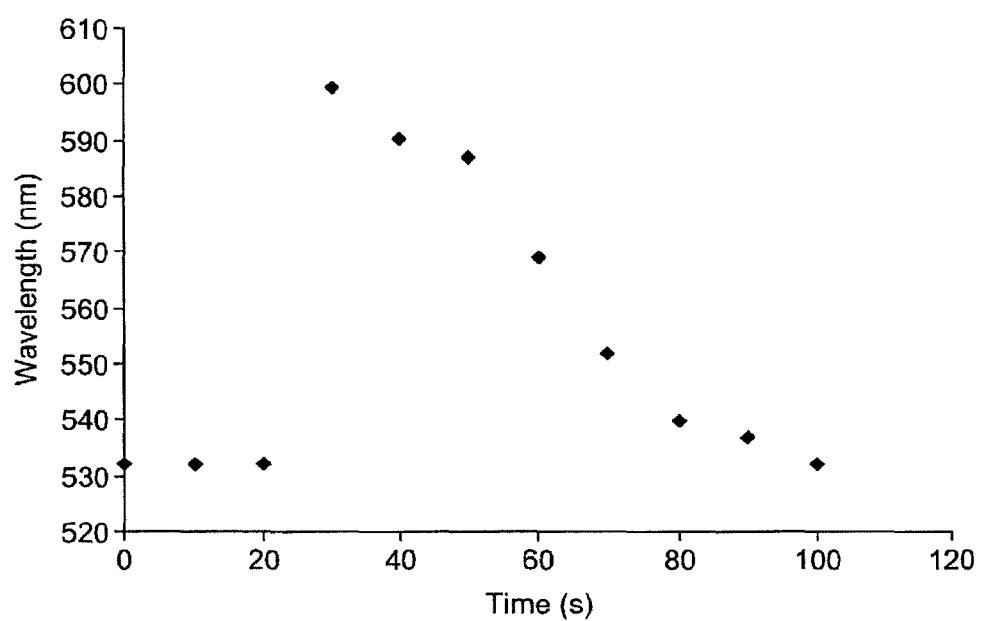
FIG. 11 is a graph of the sensitivity of a particulate PDMS hologram produced by the method of production of the invention to hexane saturated water.

Holograms produced in the PDMS droplets were brightly reflective at approximately 532 nm, the wavelength being measurable with the hemispheres still attached to the original glass slide or after removal. The sensitivity of the hologram to hexane saturated water is illustrated in FIG. 11. This simple method for producing particulate holograms was modified to produce holograms in stripes, swirls and a range of other shapes.

Example 17

1 g of polyvinyldichloride (PVdC) film was warmed to 50° C. in a tightly stoppered bottle containing 10 ml of a 0.5M solution of AgPFP in a 1:1 mixture (v:v) of chlorobenzene: THF. After 30 minutes, 200 µl the resultant mixture was dispensed onto the surface of a clean glass slide and the slide was allowed to dry. The slide was exposed to a Nd:YAG laser operating at 532 nm as per Example 1, producing a weak diffraction grating reflecting with a weak wavelength of 533 nm.

Example 18

A hologram was produced in PDMS according to the procedure described in Example 1 with the exception that a 0.3% solution of gold chloride in THF is used in place of the 0.1M AgPFP solution in THF. A mauve coloured gold colloid was rapidly produced in the PDMS layer. A good reflection grating was produced by exposure of the slide to a Nd:YAG laser operating at 532 nm as per Example 1.

Example 19

1 g of starch (Category No. S5651, Sigma-Aldrich) was added to 9 g of cold de-ionised water and heated to approximately 90° C. in a water bath and the solution was agitated continuously. Upon removal of the heat source, 1.5 g of acrylamide and 0.5 g of methacrylamide were added into the agitated aqueous starch solution and dissolved. 0.15 g of methylene bisacrylamide was added to the warm agitated solution and dissolved. 30 mg of the free radical generator 2,2' Azobis(2-methylpropionamidine) dihydrochloride (Aldrich Category No. 440914) was added when the solution reached room temperature.

A 0.1 ml blob of the resultant solution was pipetted onto the aluminium coated side of a metallised polyester sheet and a slide pre-subbed with trimethoxypropyl methacrylate was placed on top of the blob of solution and pushed down so that the solution covered the slide. The coated slide was positioned 4 inches from two horizontal 15 W OSRAM "Black light" tubes and exposed to U.V. light for an hour.

A colloidal silver dispersion having an optical density of approximately 0.7-1.2 was deposited within the cross-linked coating on the slide. The colloidal silver dispersion was deposited within the cross-linked coating by mixing a equal volumes of a first 0.2M silver nitrate solution with a second 0.25M hydroquinone solution containing 0.5% acetic acid and dispensing an array of 0.2 ml droplets of the resultant solution onto a glass sheet. A coated slide was placed on each droplet pushed down so that the solution covered the slide. The slides were removed after approximately one minute and the excess solution was wiped off the surface. The slides, while still swollen with solution, were placed individually in a transparent container of alkaline triethylamine vapour. The slides darkened rapidly and were removed as soon as the density of the silver was sufficient. The colloidal silver dispersion was formed by a chemical reduction process involving the hydroquinone and the alkaline triethylamine vapour. The darkened slides were rinsed in water and subsequently rinsed for 20 seconds in an agitated solution of 20% sodium thiosulfate, a photographic "fix" solution, in order to remove any excess silver salts which could inhibit the activity of the enzyme alpha amalyse.

The slides were rinsed in water once more and kept in a moist state to maintain the sensitivity of the starch to the enzyme. It was found that the sensitivity of the substrate on the slide to the enzyme solution was much diminished if the slide was allowed to dry. In any case, it was necessary to carry out the laser ablation step while the slide was in a swollen wet state to enable the holographic reflection grating to be recorded at 532 nm and which could thereafter be replayed in a buffer solution at approximately the same wavelength as the support medium or substrate swells to approximately the same degree when used as a sensor for alpha amylase.

Figure 12:
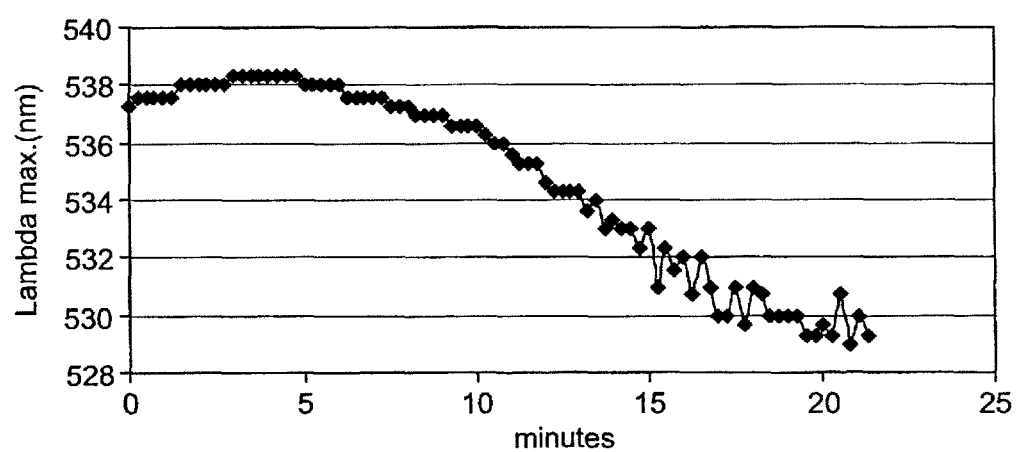
FIG. 12 is a graph of the sensitivity of a starch-acrylamide hologram produced by the method of production of the invention to alpha amylase.

The slide was exposed to a Nd:YAG laser operating at 532 nm as per Examples 1. The resultant hologram was exposed to samples of a and 13 amylases. The hologram irreversibly contracted in response to α-amylase while being completely irresponsive to β amylase. The response of the hologram to α-amylase is illustrated in FIG. 12.

Example 20

PDMS coated glass slides were prepared as described in Example 1. 200 µl of a 0.2M solution of hydroquinone in THF was mixed with 200 µl of a 0.1M solution of AgPFP in THF and subsequently dispensed onto a clean glass surface. The PDMS coated surface of the glass slide was placed on top of solution on the clean glass surface and the solution was allowed to perfuse into the PDMS film for approximately 3 minutes. The slide was then dried in a stream of warm air and exposed to the beam of laser light as described in Example 1.

Figure 13:
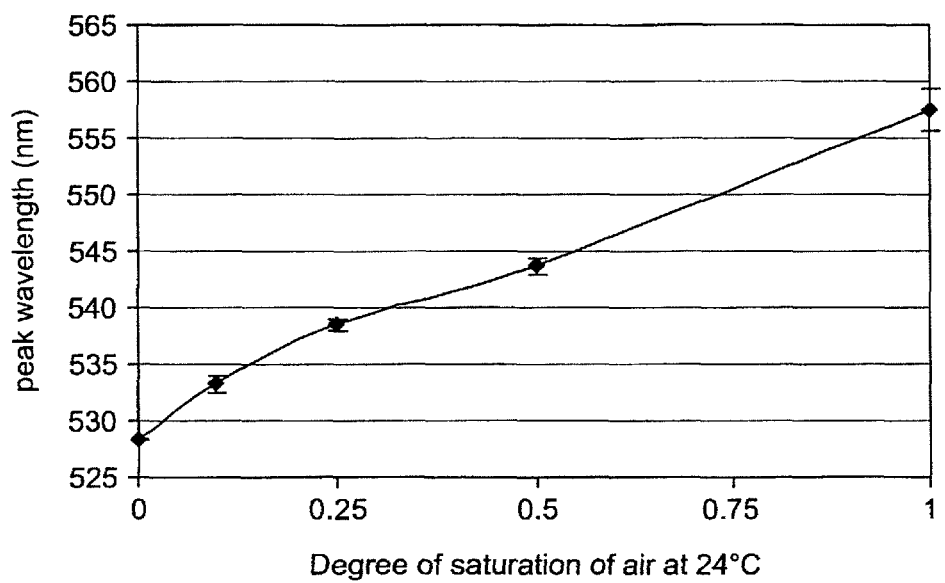
FIG. 13 is a graph of the sensitivity of a PDMS hologram to petrol (lead free vapour).

Standard lead free petroleum was added to a 1 liter bottle to form a 1 cm deep layer. The interior of the bottle was lined with thick absorbent paper to wick up the liquid petroleum thereby enabling vapour saturation of the air in the bottle. Samples of the vapour were drawn through a narrow flexible tube into a 60 cc syringe. The maximum volume drawn into the syringe was 50 cc. The sample was injected into the twin-cell cuvette positioned in a reflection spectrometer over a period of approximately 1 minute as described in Example 1. Smaller samples of petroleum vapour were withdrawn from the 1 liter bottle and mixed with air to provide a 50 cc sample size for injection into the twin-cell cuvette. The sensitivity of the hologram to petroleum vapour is illustrated in FIG. 13.

Example 21

1. Preparation of Enzyme Immobilized Poly-Acrylamide Films

Acrylamide polymers were produced by adding 230 µl acrylamide polymer mixture containing acrylamide and methacrylamide (backbone), methacrylic acid, methylenebisacrylamide (crosslinker), APS (initiator) and TEMED (catalyst of initiator) on the non-conducting side of aluminium foil and covering the liquid with a prepared glass slide. Dissolved Acetylcholinesaterase enzyme was added to the polymer mixture before the polymerisation. After polymerisation for 2 hours at room temperature (25° C.), the slide was peeled off the foil and washed with distilled water. The polymer was soaked in 150 µl silver perchlorate solution (0.5 M in isopropanol/water 1:1 (v/v)) for 5 minutes. Excessive silver was wiped off with a fine paper towel and dried with warm air for 60 seconds. The slide with the polymer was soaked in 5% (w/w) LiBr solution (6:4 distilled water:isopropanol) for 30 seconds and then in freshly prepared sodium borohydride solution for 30 seconds in order to reduce $Ag^+$ to elementary silver. Finally the polymer on the slide was washed with water.

2. Enzyme Activity in Films

The polymer with the immobilized enzyme was stored in 1 mM phosphate buffer pH 7 during the procedure. To test the enzyme activity in the sensor after the different steps of fabrication, a strip of the enzyme-containing polymer was put on the opposite side of a cuvette which already contained a non-enzyme hologram. This second hologram was used to measure the enzyme activity by recording the wavelength shift due to a pH change after addition substrate to the cuvette.

Figure 14:
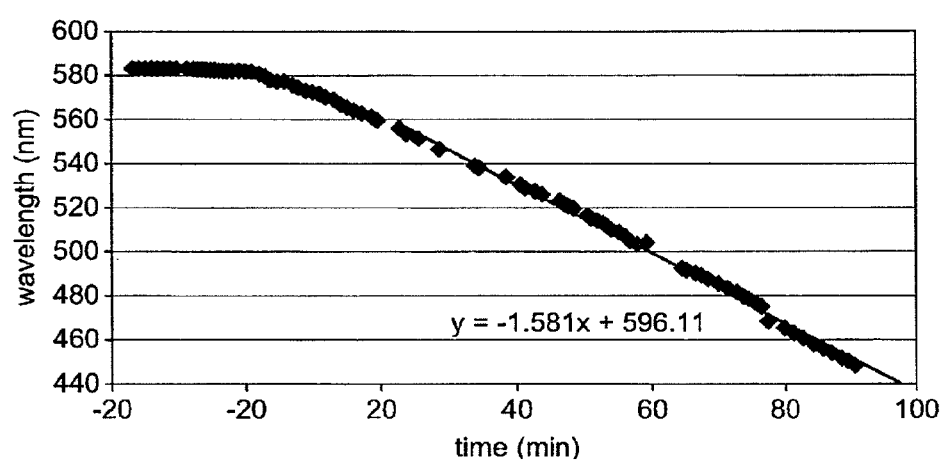
FIG. 14 is graph illustrating the reaction of an enzyme immobilised in acrylamide.

In the acrylamide polymer, there is enzyme activity remaining: A rate of change of wavelength of –1.58 nm/min was measured, corresponding to –0.01 pH units/min (FIG. 14) showing that the enzyme is active.

3. Hologram Construction and Testing

Figure 15:
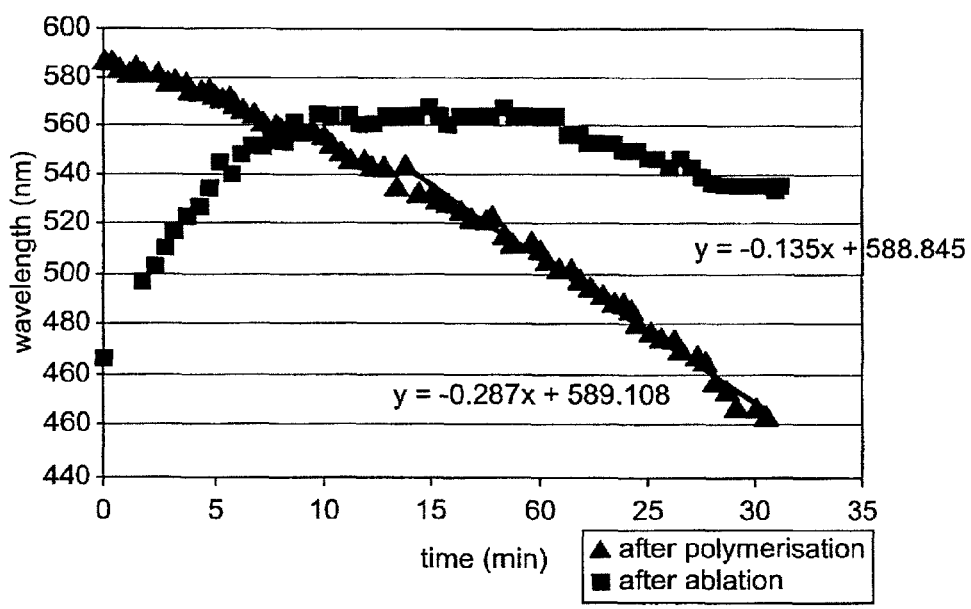
FIG. 15 is a graph of the enzyme activity of an enzyme immobilised in a hologram before and after silver salt treatment.

A third slide of silver-polymer and enzyme was treated with sodium thiosulphate. The of polymer films comprising the immobilized enzyme were then ablated with a Nd:YAG laser (532 nm) in the set-up of FIG. 1. A fourth slide without enzyme was used to measure the wavelength shift due to change in pH. The wavelength shift achieved in response to acetylcholine for the slide before and after ablation is shown in FIG. 15, which shows that although there is loss of enzyme activity due to ablation, sufficient activity remains to be detectable (0.14 nm/min).

Example 22

1. Fabrication of Sensors

Polydimethylsiloxane PDMS Sylgrad184® from Dow Corning was prepared by mixing with a ratio of 10:1 PDMS and curing agent mixed thoroughly. Next, glass microscope slides were coated by spreading the PDMS with a Mayer rod #14 (Mayer, 1912) to form a 32 µm thick wet film, and finally, dried in a preheated oven at 70° C. for 2 hours. Solutions of 200 µl of silver pentafluoropropianate (AgPFP), and Hydroquinone (HQ) dissolved in tetrahydrofuran (THF) at 0.2 µM and 0.1 µM, respectively, were applied simultaneously (spreading with a pipette tip) on top of the PDMS film. Once the solvents had evaporated after spreading, the films were dried under a flow of hot air for 1 minute, washed with ethanol to remove the excess of silver particles, dried again with a hot air flow for 1 minute, then left to cool down. The film containing silver particles is placed at ~7° inclination with a mirror surface perpendicular to the a Nd:YAG pulsed laser beam, operated at its second harmonic (532 nm). The hologram was shot twice with laser spot of ~1 cm on the PDMS surface.

2. Isobutane Detection and Reproducibility

Figure 16:
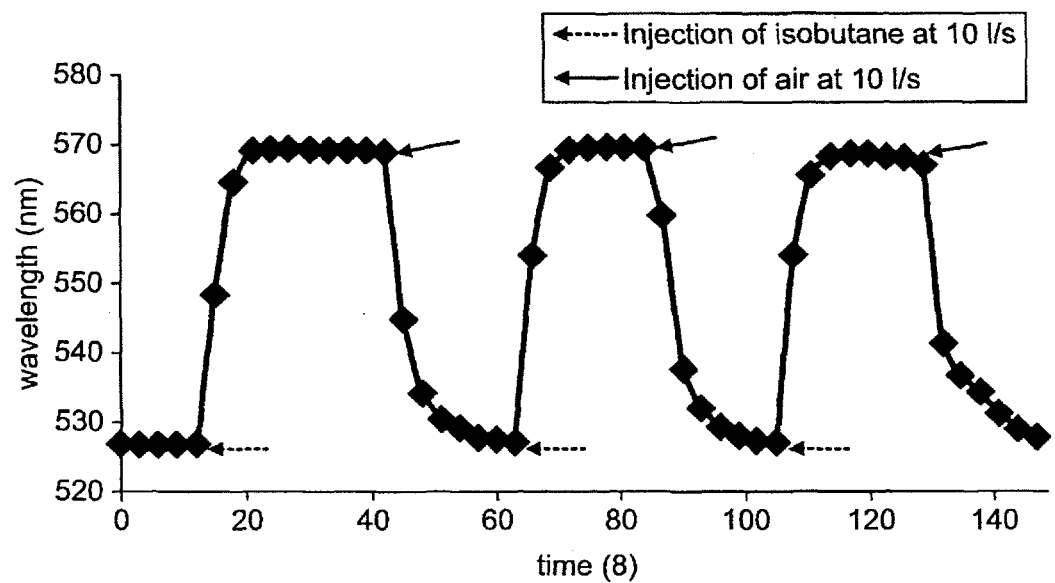
FIG. 16 is a graph of a hologram response to isobutene.

Isobutane was passed over the sensor mounted in a sealed cuvette forma 60 µl syringe at 100% concentration and then the cuvette was opened to atmosphere to flush with air. This was repeated three times. The results showed good reproducibility with no loss of sensitivity (FIG. 16).

3. Further Gas Species

Figure 17:
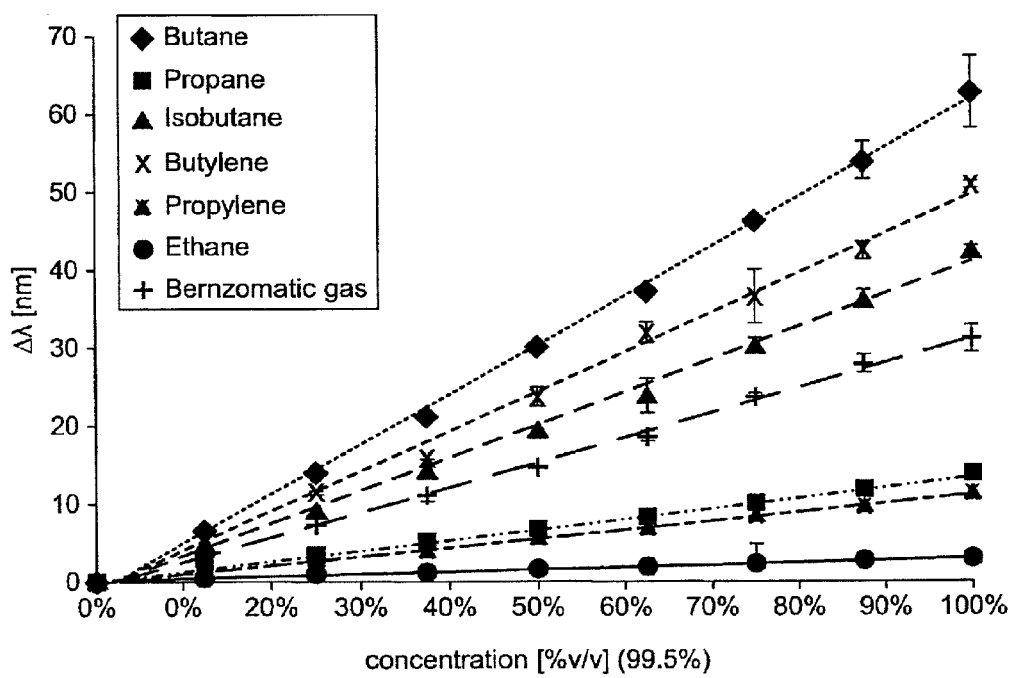
FIG. 17 is a graph of a holographic response to different gases at different concentrations at 22° C.

Other gases have been shown to display linear behaviour as a function of concentration in air. These are shown in FIG. 17.

Example 23

A portion of 250 ul monomer solution comprising 91.5 mol % 2-hydroxyethylmethacrylate (HEMA), 2.5 mol % ethyleneglycol dimethacrylate (EDMA) and 6 mol % methacrylic acid (MAA) is mixed with 250 ul 1 %(w/v) 2,2-dimethoxy-2-phenyl acetophenone (DMPA) as free-radical initiator. Next, 120 µl of spore suspension (Wildtype *Bacillus megaterim;* 2*109/mL.), 80 µl UHP water, and 30 µl 50 vol % Tween 80 (filtered by 0.22 uM filter) are added into the mixture.

200 µl of the mixture described above is pipetted on the conducting side of aluminum foil. The liquid was covered with a silanized glass slide. Polymerization occurred during a 15 minute exposure to UV light. The slides are then peeled off the foil and washed with a dash of ethanol and some distilled water. Polymer films containing spores are then put on ice. Slides are dried with cool air. The polymer film is then soaked in 200 µl 0.15 M silver perchlorate solution (in 1:4 distilled water to isopropanol) for 3 minutes. Excess silver was wiped off gently with a fine paper towel and is dried with a hair dryer for 5 seconds. The slides are then soaked in LiBr solution (60 g LiBr added to 300 mL Methanol and 200 mL water) for 30 seconds. After washing with water, slides are soaked in freshly prepared sodium borohydride solution (0.3 g sodium borohydride added to 50 mL ethanol and 50 mL distilled water) for 15 seconds. Finally, the slides were then put in water and exposed to 2 consecutive pulses from a frequency-doubled (532 nm) Nd:YAG laser.

Spore germination was initiated by adding 25 mM GPLK solution buffered by 5 mM Tris-HCl buffer to the pH of 7.8.

Figure 18:
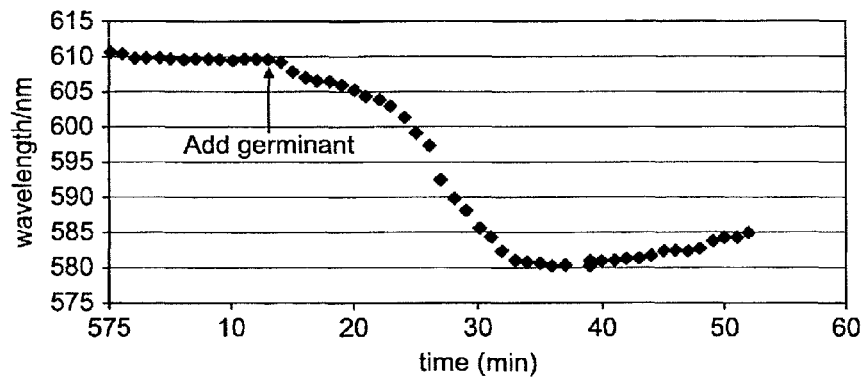
FIG. 18 is a graph of a holographic response to spore germination.

The resulting wavelength change is shown in FIG. 18. The wavelength shift is caused by the increase of proton concentration in the hologram arising from the CA-DPA germination product.

Figure 19:
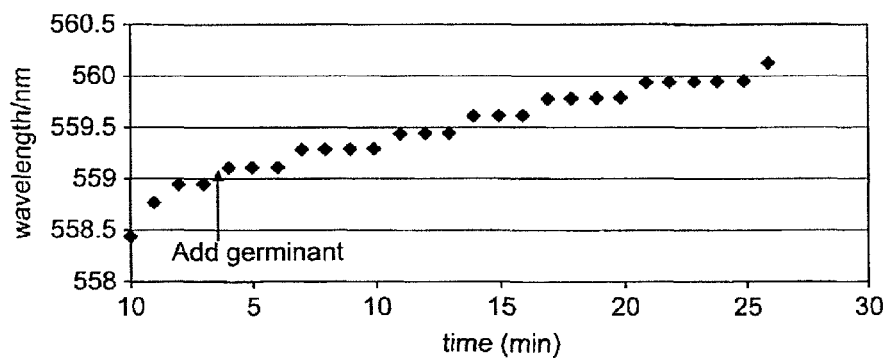
FIG. 19 is a graph of control holographic response of a hologram that does not contain any spores.

A control hologram without spores was also constructed and demonstrated the behaviour in illustrated in FIG. 19.

Figure 20:
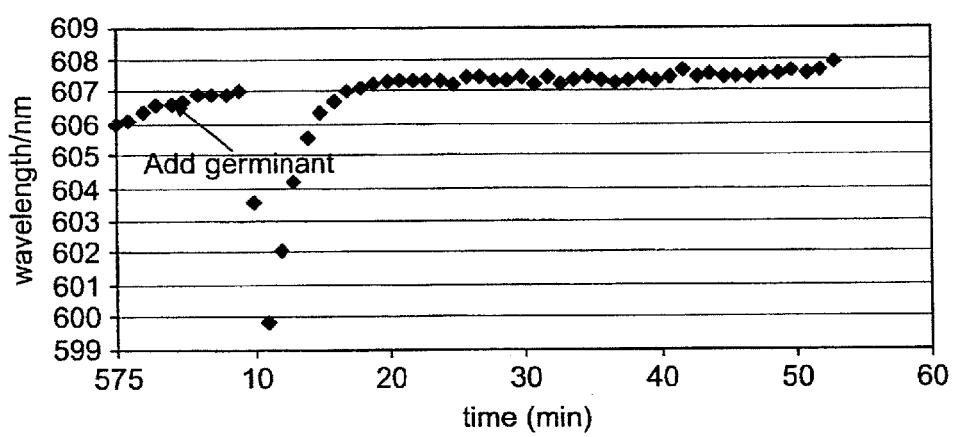
FIG. 20 is a graph of a holographic response to spore germination in low water concentration.

Further experiments were carried out but using 50 ul spores suspension (4.8*109/nL) and 30 µl 50 vol % Tween 80 (filtered by 0.22 uM filter), but no added water. The results are shown in FIG. 20. The lower water content can be seen to give rise to a larger and more rapid germination, followed by a faster recovery to the baseline (cessation of germination).

The invention claimed is:

1. A method for the production of a holographic sensor which comprises a support medium supporting a reflection hologram wherein the support medium interacts with its physical or chemical environment to create an optical response which is a change in one or more optical properties of the hologram, the method comprising the steps of:
   a) introducing a colloidal dispersion of a recording material into the support medium; and
   b) exposing the colloidal particles of the recording material to reduce their size using a holographic exposure pattern generated with a pulsed laser beam to form a holographic element of the reflection hologram in the support medium.

2. The method according to claim 1, wherein the support medium is a hydrophobic polymer.

3. The method according to claim 2, wherein the polymer is a hydrophobic synthetic polymer selected from the group consisting of siloxanes, polystyrene, polyolefins, fluoropolymers, polyaramid, polycarbonates, acrylic polymers, methacrylates, styrenes and substituted styrenes, polysulfones, epoxies, polyacrylonitriles, polyamides, polyimides, polyvinyl chloride, polyvinylidene chloride, polyvinyl acetals, polyesters, polyvinyl esters, polyethers, polyvinyl ethers, polydiacetylenes, polyvinyl acetate, polyethylene terephthalate and polyethylene oxide, optionally copolymerised with other polymerizable monomers or cross-linkers.

4. The method according to claim 2, wherein the support medium is polydimethylsiloxane (PDMS).

5. The method according to claim 1, wherein the support medium is a hydrophilic polymer.

6. The method according to claim 5, wherein the polymer is a hydrophilic natural polymer selected from the group consisting of gelatine, starch, agarose, polyvinyl alcohol, polyvinylpyrrolidone, acrylic polymers, methacrylates, polyacrylamides, polymethacrylamides, homopolymers or copolymers of polymerisable derivatives of crown ethers, and esters of or co- or terpolymers of polyhydroxyethyl acrylate, polyhydroxyethyl methacrylate, polymethacrylamide and polyacrylamide, optionally copolymerised with other polymerizable monomers or cross-linkers.

7. The method according to claim 5, wherein the polymer is cross-linked.

8. The method according to claim 2, wherein the polymer is cross-linked.

9. The method according to claim 1, wherein the support medium comprises a receptor.

10. The method according to claim 1, wherein the recording material is a metal.

11. The method according to claim 10, wherein the metal is selected from silver, gold, iron, copper, tin, nickel and lead.

12. The method according to claim 10, wherein the colloidal metal dispersion is prepared in situ by diffusion of a solution of a metal salt into the support medium and subsequent chemical reduction of the metal salt to form the colloidal metal dispersion.

13. The method according to claim 10, wherein the colloidal metal dispersion is pre-prepared by chemical reduction of a solution of a metal salt and subsequently introduced into the support medium by diffusion.

14. The method according to claim 10, wherein the exposed metal particles, after exposure with the pulsed laser beam, have a grain size substantially less than the wavelength of light used for the pulsed exposure.

15. The method according to claim 14, wherein the exposed metal particles have a grain size of no more than 50 nm.

16. The method according to claim 1, wherein the change in one or more optical properties of the hologram is caused by a variation in a physical property of the support medium, the physical property being the size, shape, density, viscosity, strength, hardness, hydrophobicity, hydrophilicity, swellability, integrity or polarisability of the support medium or charge distribution in the support medium.

* * * * *